United States Patent
Takamatsu

(10) Patent No.: US 10,570,235 B2
(45) Date of Patent: Feb. 25, 2020

(54) COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventor: Hiromi Takamatsu, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 16/094,616

(22) PCT Filed: Apr. 20, 2017

(86) PCT No.: PCT/JP2017/015941
§ 371 (c)(1),
(2) Date: Oct. 18, 2018

(87) PCT Pub. No.: WO2017/195563
PCT Pub. Date: Nov. 16, 2017

(65) Prior Publication Data
US 2019/0106521 A1  Apr. 11, 2019

(30) Foreign Application Priority Data

May 10, 2016 (JP) .................. 2016-094772

(51) Int. Cl.
*C08F 220/56* (2006.01)
*C08L 33/26* (2006.01)
*H01M 10/058* (2010.01)
*H01M 2/16* (2006.01)
*C08L 25/08* (2006.01)
*H01M 4/13* (2010.01)
*C08K 3/30* (2006.01)
*H01M 4/66* (2006.01)
*H01M 10/0525* (2010.01)

(52) U.S. Cl.
CPC .............. *C08F 220/56* (2013.01); *C08K 3/30* (2013.01); *C08L 25/08* (2013.01); *C08L 33/26* (2013.01); *H01M 2/16* (2013.01); *H01M 2/166* (2013.01); *H01M 4/13* (2013.01); *H01M 4/666* (2013.01); *H01M 10/058* (2013.01); *H01M 10/0525* (2013.01); *C08F 2800/20* (2013.01); *C08K 2003/3018* (2013.01)

(58) Field of Classification Search
CPC ........ C08F 220/56; C08K 3/30; H01M 2/166; H01M 10/058; H01M 10/0525; H01M 2/16; C08L 25/08; C08L 33/26
USPC ......................................................... 524/423
See application file for complete search history.

(56) References Cited

U.S. PATENT DOCUMENTS

| | | | |
|---|---|---|---|
| 2007/0173549 A1* | 7/2007 | Kanzaki | B01D 71/40 521/27 |
| 2014/0186680 A1* | 7/2014 | Kim | H01M 2/1646 429/144 |
| 2014/0205904 A1* | 7/2014 | Sasaki | H01M 4/622 429/217 |
| 2016/0344007 A1 | 11/2016 | Toyoda et al. | |
| 2016/0351873 A1 | 12/2016 | Sasaki | |

FOREIGN PATENT DOCUMENTS

| | | |
|---|---|---|
| JP | 2013145763 A | 7/2013 |
| WO | 2015122322 A1 | 8/2015 |
| WO | 2015145967 A1 | 10/2015 |

OTHER PUBLICATIONS

Nov. 13, 2018, International Preliminary Report on Patentability issued in the International Patent Application No. PCT/JP2017/015941.

Dec. 19, 2019, the Extended European Search Report issued by the European Patent Office in the corresponding European Patent Application No. 17795924.4.

* cited by examiner

*Primary Examiner* — Doris L Lee
(74) *Attorney, Agent, or Firm* — Kenja IP Law PC

(57) ABSTRACT

A composition for a non-aqueous secondary battery functional layer comprises: non-conductive particles; a water-soluble polymer containing a (meth)acrylamide monomer unit in a proportion of 70.0 mass % or more and 99.0 mass % or less; and a water-insoluble polymer containing an ethylenically unsaturated carboxylic acid monomer unit in a proportion of 1.5 mass % or more and 5.0 mass % or less and having a degree of swelling in electrolyte solution of more than 1.0 time and 3.0 times or less.

8 Claims, No Drawings

COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

The present disclosure relates to a composition for a non-aqueous secondary battery functional layer, a functional layer for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. A non-aqueous secondary battery normally includes battery components such as a positive electrode, a negative electrode, and a separator that separates the positive electrode and the negative electrode to prevent short-circuiting between the positive electrode and the negative electrode.

In secondary batteries, battery components including functional layers that impart desired performance (e.g. heat resistance or strength) to the battery components are used. Specific examples of such battery components used include a separator that is obtained by forming a functional layer on a separator substrate and an electrode that is obtained by forming a functional layer on an electrode substrate formed by providing an electrode mixed material layer on a current collector. As a functional layer capable of improving the heat resistance, strength, or the like of a battery component, a functional layer composed of a porous membrane layer formed by binding non-conductive particles by a binder is used. For example, this functional layer is formed by applying, to a surface of a substrate (such as a separator substrate or an electrode substrate), a composition for a functional layer containing non-conductive particles, any of various polymers capable of functioning as a binder, and a dispersion medium and drying the applied composition for a functional layer.

In recent years, there has been a large amount of activity directed toward improving compositions for a non-aqueous secondary battery functional layer that are used in the formation of functional layers, with an objective of providing secondary batteries having even higher performance (for example, see WO 2015/145967 A1 (PTL 1)).

Specifically, PTL 1 proposes a technique of containing, in a composition for a porous membrane which is a composition for a non-aqueous functional layer, a particulate polymer that is a random copolymer including at least 35 mass % of a (meth)acrylic acid alkyl ester monomer unit and at least 30 mass % and not greater than 65 mass % of an aromatic monovinyl monomer unit and has a degree of swelling of more than 1.0 time and 2.0 times or less in a non-aqueous electrolyte solution. A composition for a functional layer containing a particulate polymer having such a composition and properties improves the durability of a porous membrane forming a functional layer and has enhanced stability under high shear.

CITATION LIST

Patent Literature

PTL 1: WO 2015/145967 A1

SUMMARY

Technical Problem

In terms of achieving higher performance of a non-aqueous secondary battery, a functional layer formed using a composition for a functional layer is required to have low resistance and be capable of improving the output characteristics of the secondary battery including the functional layer. The range of applications of non-aqueous secondary batteries is expanding in recent years, and there is demand for a non-aqueous secondary battery that displays favorable electrical characteristics even when used under harsh conditions in which large vibrations are likely to be imparted on the non-aqueous secondary battery. A non-aqueous secondary battery generates heat in association with charging and discharging, and a functional layer included in the non-aqueous secondary battery tends to contract due to heating. In terms of improving the high-temperature cycle characteristics of a secondary battery, a functional layer is required to resist contraction even when heated, i.e. required to have sufficient heat contraction resistance.

When a functional layer formed using the composition for a non-aqueous secondary battery functional layer containing the particulate polymer satisfying the predetermined composition and properties described in PTL 1 is subjected to vibration in a state of being immersed in an electrolyte solution, non-conductive particles may drop off the functional layer relatively easily. Besides, the heat contraction resistance of the functional layer is insufficient. A secondary battery including such a functional layer has room for improvement in electrical characteristics (in particular high-temperature cycle characteristics and output characteristics).

It could therefore be helpful to provide a composition for a non-aqueous secondary battery functional layer capable of forming a functional layer for a non-aqueous secondary battery that resists drop-off of non-conductive particles and the like from the functional layer even when subjected to vibration in a state of being immersed in an electrolyte solution (i.e. has excellent vibration drop-off resistance in electrolyte solution) and also has excellent heat contraction resistance. It could also be helpful to provide a functional layer for a non-aqueous secondary battery formed using the composition for a non-aqueous secondary battery functional layer, and a non-aqueous secondary battery including the functional layer for a non-aqueous secondary battery and having excellent electrical characteristics (in particular high-temperature cycle characteristics and output characteristics).

Solution to Problem

Through extensive studies to solve the problems stated above, the inventor discovered that, by combined use of a water-soluble polymer having a predetermined composition and a water-insoluble polymer satisfying a predetermined composition and properties, a composition for a non-aqueous secondary battery functional layer capable of forming a functional layer for a non-aqueous secondary battery excellent in vibration drop-off resistance in electrolyte solution and heat contraction resistance can be obtained, and the electrical characteristics (in particular high-temperature cycle characteristics and output characteristics) of a secondary battery including a functional layer formed using the composition for a functional layer can be improved.

To advantageously solve the problems stated above, a presently disclosed composition for a non-aqueous secondary battery functional layer comprises: non-conductive particles; a water-soluble polymer containing a (meth)acrylamide monomer unit in a proportion of 70.0 mass % or more and 99.0 mass % or less; and a water-insoluble polymer containing an ethylenically unsaturated carboxylic acid monomer unit in a proportion of 1.5 mass % or more and 5.0 mass % or less and having a degree of swelling in electrolyte solution of more than 1.0 time and 3.0 times or less. Such a composition for a non-aqueous secondary battery functional layer that includes non-conductive particles, a water-soluble polymer containing a (meth)acrylamide monomer unit in the above-mentioned predetermined proportion, and a water-insoluble polymer containing an ethylenically unsaturated carboxylic acid monomer unit in the above-mentioned predetermined proportion and having a degree of swelling in electrolyte solution of more than 1.0 time and 3.0 times or less is capable of forming a functional layer for a non-aqueous secondary battery excellent in vibration drop-off resistance in electrolyte solution and heat contraction resistance. A non-aqueous secondary battery including a functional layer formed using such a composition for a functional layer has improved electrical characteristics (in particular high-temperature cycle characteristics and output characteristics).

Herein, the "degree of swelling in electrolyte solution" of the water-insoluble polymer can be measured by a measurement method described in the EXAMPLES section of the present specification. The phrase "includes a monomer unit" as used herein means that "a polymer obtained with the monomer includes a structural unit derived from the monomer". The "water-soluble polymer" as used herein means that, when 0.5 g of the polymer is dissolved in 100 g of water at a temperature of 25° C., insoluble matter is less than 1.0 mass %. The "water-insoluble polymer" as used herein means that, when 0.5 g of the polymer is dissolved in 100 g of water at 25° C., insoluble matter is 90 mass % or more.

Preferably, in the presently disclosed composition for a non-aqueous secondary battery functional layer, the water-soluble polymer contains a cross-linkable monomer unit in a proportion of 0.01 mass % or more and 4.0 mass % or less. As a result of the water-soluble polymer containing a cross-linkable monomer unit in the above-mentioned proportion, the electrical characteristics of a non-aqueous secondary battery including a functional layer formed using the composition for a functional layer can be further improved.

Preferably, in the presently disclosed composition for a non-aqueous secondary battery functional layer, the water-insoluble polymer contains a cross-linkable monomer unit in a proportion of 0.01 mass % or more and 4.0 mass % or less. As a result of the water-insoluble polymer containing a cross-linkable monomer unit in the above-mentioned proportion, the electrical characteristics of a non-aqueous secondary battery including a functional layer formed using the composition for a functional layer can be further improved.

Preferably, in the presently disclosed composition for a non-aqueous secondary battery functional layer, the water-soluble polymer has a degree of swelling in electrolyte solution of more than 1.0 time and 2.0 times or less. As a result of the degree of swelling in electrolyte solution of the water-soluble polymer being in the above-mentioned range, the heat contraction resistance of a functional layer formed using the composition for a functional layer can be further improved, and the electrical characteristics of a non-aqueous secondary battery can be further improved.

Preferably, in the presently disclosed composition for a non-aqueous secondary battery functional layer, the water-insoluble polymer contains an aromatic monovinyl monomer unit in a proportion of 10 mass % or more and 60 mass % or less. As a result of the water-insoluble polymer containing an aromatic monovinyl monomer unit in the above-mentioned proportion, the heat contraction resistance of a functional layer and the electrical characteristics of a secondary battery including the functional layer can be further improved.

Preferably, in the presently disclosed composition for a non-aqueous secondary battery functional layer, a content by mass of the water-insoluble polymer is 0.1 times or more and 2.5 times or less the water-soluble polymer. As a result of the ratio of the water-insoluble polymer and the water-soluble polymer contained in the composition for a functional layer being in the above-mentioned range, a composition for a non-aqueous secondary battery functional layer capable of forming a functional layer for a non-aqueous secondary battery further excellent in vibration drop-off resistance in electrolyte solution and heat contraction resistance can be obtained.

A presently disclosed functional layer for a non-aqueous secondary battery is formed using any of the compositions for a non-aqueous secondary battery functional layer described above.

A presently disclosed non-aqueous secondary battery includes the functional layer for a non-aqueous secondary battery.

Advantageous Effect

It is therefore possible to provide a composition for a non-aqueous secondary battery functional layer capable of forming a functional layer for a non-aqueous secondary battery excellent in vibration drop-off resistance in electrolyte solution and heat contraction resistance. With use of the composition for a non-aqueous secondary battery functional layer, a functional layer for a non-aqueous secondary battery excellent in vibration drop-off resistance in electrolyte solution and heat contraction resistance and a non-aqueous secondary battery including the functional layer for a non-aqueous secondary battery and having excellent electrical characteristics (in particular output characteristics and high-temperature cycle characteristics) can be formed favorably.

DETAILED DESCRIPTION

One of the disclosed embodiments is described in detail below.

A presently disclosed composition for a non-aqueous secondary battery functional layer is used as a material when producing a functional layer for a non-aqueous secondary battery. A presently disclosed functional layer for a non-aqueous secondary battery is formed using the presently disclosed composition for a non-aqueous secondary battery functional layer. A presently disclosed non-aqueous secondary battery includes at least the presently disclosed functional layer for a non-aqueous secondary battery.

(Composition for Non-Aqueous Secondary Battery Functional Layer)

The presently disclosed composition for a non-aqueous secondary battery functional layer is a slurry composition that contains non-conductive particles, a water-soluble polymer, and a water-insoluble polymer and optionally further contains additives and the like, and has water or the like as a dispersion medium. The presently disclosed composition for a non-aqueous secondary battery functional layer contains, as the water-soluble polymer, a polymer containing a (meth)acrylamide monomer unit in a proportion of 70.0 mass % or more and 99.0 mass % or less, and, as the water-insoluble polymer, a polymer containing an ethylenically unsaturated carboxylic acid monomer unit in a proportion of 1.5 mass % or more and 5.0 mass % or less and having a degree of swelling in electrolyte solution of more than 1.0 time and 3.0 times or less.

The presently disclosed composition for a non-aqueous secondary battery functional layer that uses in combination the water-soluble polymer having the predetermined composition and the water-insoluble polymer satisfying the predetermined composition and properties is capable of forming a functional layer for a non-aqueous secondary battery excellent in vibration drop-off resistance in electrolyte solution and heat contraction resistance.

<Non-Conductive Particles>

The non-conductive particles are particles that maintain their shape without dissolving in the dispersion medium of the composition for a non-aqueous secondary battery functional layer and a non-aqueous electrolyte solution of a secondary battery. The non-conductive particles are electrochemically stable and are, therefore, present stably in a functional layer in a usage environment of a secondary battery.

[Type of Non-Conductive Particles]

Various types of inorganic particles and organic particles can for example be used as the non-conductive particles.

Specifically, inorganic particles and organic fine particles other than the water-insoluble polymer can both be used as the non-conductive particles. Of such particles, non-conductive particles formed by a material that is present stably in a usage environment of a non-aqueous secondary battery and that is electrochemically stable are preferable. More specifically, examples of inorganic particles that can be used as the non-conductive particles include particles of oxides such as aluminum oxide (alumina), aluminum oxide hydrates (Boehmite (AlOOH), gibbsite (Al(OH)$_3$)), silicon oxide, magnesium oxide (magnesia), calcium oxide, titanium oxide (titania), barium titanate (BaTiO$_3$), ZrO, and alumina-silica composite oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary. Of these, barium sulfate particles and alumina particles are preferable as inorganic particles added as the non-conductive particles.

Examples of organic particles that can be used as the non-conductive particles include typical organic particles including: particles of various cross-linked polymers such as polyethylene, polystyrene, polydivinyl benzene, cross-linked styrene-divinyl benzene copolymer, polyimide, polyamide, polyamide imide, melamine resin, phenolic resin, and benzoguanamine-formaldehyde condensate; and particles of heat resistant polymers such as polysulfone, polyacrylonitrile, polyaramid, polyacetal, and thermoplastic polyimide.

As the organic particles, organic particles of a core-shell structure having a core portion and a shell portion formed using polymers that differ in composition and/or properties may be used. A non-limiting example of such organic particles having a core-shell structure is as follows: a polymer forming a core portion is formed by polymerizing a (meth)acrylic acid ester monomer such as methyl acrylate, ethyl acrylate, butyl acrylate, methyl methacrylate, ethyl methacrylate, or 2-ethylhexyl acrylate, an acid group-containing monomer such as (meth)acrylic acid, and a cross-linkable monomer such as a di(meth)acrylic acid ester compound, e.g. ethylene dimethacrylate, diethylene glycol dimethacrylate, ethylene glycol dimethacrylate, diethylene glycol diacrylate, or 1,3-butylene glycol diacrylate, and a polymer forming a shell portion is formed by polymerizing an aromatic monovinyl monomer such as styrene or a styrene derivative, e.g. styrene sulfonic acid. The ratio of each type of monomer unit constituting the organic particles is preferably as follows: For the core portion, the ratio of the (meth)acrylic acid ester monomer unit is 50 mass % or more and 100 mass % or less, the ratio of the acid group-containing monomer unit is 0.1 mass % or more and 20 mass % or less, and the ratio of the cross-linkable monomer unit is 0.1 mass % or more and 5 mass % or less relative to 100 mass % of the total of monomer units constituting the organic particles. For the shell portion, the ratio of the aromatic monovinyl monomer unit is 20 mass % or more and 100 mass % or less relative to 100 mass % of the total of monomer units constituting the organic particles.

The organic particles are preferably organic particles having a core-shell structure, and more preferably organic particles having a core-shell structure composed of a core portion including a methyl methacrylate monomer unit, a methacrylic acid monomer unit, and an ethylene glycol dimethacrylate monomer unit and a shell portion including a styrene monomer unit.

Herein, "(meth)acrylic" refers to acrylic or methacrylic.

The organic particles that can be used as the non-conductive particles preferably have a glass-transition temperature of more than 30° C. and 200° C. or less. Particularly in the case where the non-conductive particles are organic particles having a core-shell structure, it is preferable that at least the glass-transition temperature of the polymer of the shell portion is more than 30° C. and 200° C. or less.

The organic particles and the below-mentioned water-insoluble polymer differ in terms that the water-insoluble polymer has binding ability whereas the organic particles do not have binding ability. The below-mentioned water-insoluble polymer is thus not included in the organic particles. The organic particles are water-insoluble, that is, when 0.5 g of the organic particles is dissolved in 100 g of water at a temperature of 25° C., insoluble matter is 90 mass % or more.

One type of non-conductive particles may be used individually, or two or more types of non-conductive particles may be used in combination. For example, as the non-conductive particles, one or more types of inorganic particles may be used in combination, one or more types of organic particles may be used in combination, and one or more types of inorganic particles and one or more types of organic particles may be used in combination.

[Properties of Non-Conductive Particles]

The volume-average particle diameter of the non-conductive particles is preferably 0.1 μm or more, more preferably 0.2 μm or more, and further preferably 0.3 μm or more, and is preferably 2.0 μm or less, more preferably 1.5 μm or less, and further preferably 1.2 μm or less. If the volume-average particle diameter of the non-conductive particles is not less than the above-mentioned lower limit, an excessive increase in the Gurley value of the functional layer can be suppressed to suppress a decrease in the ion conductivity of the functional layer, enabling a secondary battery including the functional layer to exhibit excellent output characteristics. If the volume-average particle diameter of the non-conductive particles is not more than the above-mentioned upper limit, the packing density of the functional layer can be increased to enhance the strength and heat contraction resistance of the functional layer in electrolyte solution.

Herein, the "volume-average particle diameter" of the non-conductive particles represents a particle diameter at which, in a particle size distribution (volume basis) measured by laser diffraction, the cumulative volume calculated from a small diameter end of the distribution reaches 50%.

The specific surface area of the non-conductive particles in the case where the non-conductive particles are inorganic particles is preferably 3.0 $m^2/g$ or more, more preferably 3.5 $m^2/g$ or more, and further preferably 4.0 $m^2/g$ or more, and is preferably 8.0 $m^2/g$ or less, more preferably 7.5 $m^2/g$ or less, and further preferably 7.0 $m^2/g$ or less. The specific surface area of the non-conductive particles in the case where the non-conductive particles are organic particles is preferably 0.01 $m^2/g$ or more, more preferably 0.02 $m^2/g$ or more, and further preferably 0.05 $m^2/g$ or more, and is preferably 5.0 $m^2/g$ or less, more preferably 4.0 $m^2/g$ or less, and further preferably 2.0 $m^2/g$ or less. If the specific surface area of the non-conductive particles is not less than the above-mentioned lower limit, the packing density of the functional layer can be increased to enhance the strength and heat contraction resistance of the functional layer in electrolyte solution. If the specific surface area of the non-conductive particles is not more than the above-mentioned upper limit, an excessive increase in the Gurley value of the functional layer can be suppressed to suppress a decrease in the ion conductivity of the functional layer, enabling a secondary battery including the functional layer to exhibit excellent output characteristics.

<Water-Soluble Polymer>

The water-soluble polymer included in the presently disclosed composition for a non-aqueous secondary battery functional layer contains a (meth)acrylamide monomer unit in a proportion of 70.0 mass % or more and 99.0 mass % or less. Moreover, the water-soluble polymer preferably contains a cross-linkable monomer unit in a proportion of 0.01 mass % or more and 4.0 mass % or less. The water-soluble polymer preferably has a degree of swelling in electrolyte solution of more than 1.0 time and 2.0 times or less, and more preferably has a degree of swelling in electrolyte solution of 1.5 times or less. As the water-soluble polymer, a mixture of a plurality of types of water-soluble polymers may be used.

[Composition of Water-Soluble Polymer]

The water-soluble polymer contains a methacrylamide monomer unit in the above-mentioned predetermined proportion, and may optionally contain a cross-linkable monomer unit and other monomer units.

—(Meth)Acrylamide Monomer Unit—

Examples of (meth)acrylamide monomers that can be used to form the (meth)acrylamide monomer unit include acrylamide and methacrylamide. Acrylamide is particularly preferable. One type of (meth)acrylamide monomer may be used individually, or both types of (meth)acrylamide monomers may be used in combination in a freely selected ratio.

The content proportion of the (meth)acrylamide monomer unit in the water-soluble polymer in the case where the amount of all monomer units in the water-soluble polymer is taken to be 100 mass % needs to be 70.0 mass % or more and is more preferably 72.0 mass % or more and further preferably 74.0 mass % or more, and needs to be 99.0 mass % or less and is more preferably 95.0 mass % or less and further preferably 93.0 mass % or less. If the content proportion of the (meth)acrylamide monomer unit in the water-soluble polymer is not less than the above-mentioned lower limit, the heat contraction resistance of the functional layer can be improved. If the content proportion of the (meth)acrylamide monomer unit in the water-soluble polymer is not more than the above-mentioned upper limit, the dispersion stability of solid components in the composition for a functional layer can be improved, and the functional layer formed using the composition for a functional layer can be homogenized, thus improving the electrical characteristics of the secondary battery.

—Cross-Linkable Monomer Unit—

A monomer that can form a cross-linked structure during polymerization may be used as a cross-linkable monomer that can form the cross-linkable monomer unit. Specific examples include a monofunctional monomer having a thermally cross-linkable group and one ethylenically unsaturated bond per molecule, and a multifunctional monomer having two or more ethylenically unsaturated bonds per molecule. Examples of the thermally cross-linkable group included in the monofunctional monomer include an epoxy group, an N-methylol amide group, an oxetanyl group, an oxazoline group, and combinations thereof. As a result of the cross-linkable monomer unit being included in the water-soluble polymer, the degree of swelling in electrolyte solution of the water-soluble polymer can be set at an appropriate level while also improving the dusting resistance of the functional layer.

The cross-linkable monomer may be hydrophobic or hydrophilic.

When a cross-linkable monomer is referred to as "hydrophobic" in the present disclosure, this means that the cross-linkable monomer does not have a hydrophilic group, and when a cross-linkable monomer is referred to as "hydrophilic" in the present disclosure, this means that the cross-linkable monomer has a hydrophilic group. Herein, the term "hydrophilic group" used with respect to the cross-linkable monomer refers to a carboxylic acid group, a hydroxy group, a sulfonate group, a phosphate group, an epoxy group, a thiol group, an aldehyde group, an amide group, an oxetanyl group, or an oxazoline group.

Examples of hydrophobic cross-linkable monomers that can be used include multifunctional (meth)acrylates such as allyl (meth)acrylate, ethylene di(meth)acrylate, ethylene glycol di(meth)acrylate, diethylene glycol di(meth)acrylate, triethylene glycol di(meth)acrylate, tetraethylene glycol di(meth)acrylate, and trimethylolpropane tri(meth)acrylate; multifunctional allyl/vinyl ethers such as dipropylene glycol diallyl ether, polyglycol diallyl ether, triethylene glycol divinyl ether, hydroquinone diallyl ether, and tetraallyloxyethane; and divinyl benzene.

Examples of hydrophilic cross-linkable monomers that can be used include vinyl glycidyl ether, allyl glycidyl ether, N-methylolacrylamide, acrylamide, and allyl methacrylamide.

Any one of such cross-linkable monomers may be used individually or any two or more of such cross-linkable monomers may be used in combination. Ethylene glycol dimethacrylate is preferably used as the cross-linkable monomer in the production of the water-soluble polymer.

The content proportion of the cross-linkable monomer unit in the water-soluble polymer in the case where the amount of all monomer units in the water-soluble polymer is taken to be 100 mass % is preferably 0.01 mass % or more, more preferably 0.05 mass % or more, and further preferably 0.1 mass % or more, and is preferably 4.0 mass % or less, more preferably 3.0 mass % or less, and further preferably 2.3 mass % or less. If the content proportion of the cross-linkable monomer unit in the water-soluble polymer is not less than the above-mentioned lower limit, the dispersion stability of the composition for a functional layer can be improved. Moreover, an excessive increase in the degree of swelling in electrolyte solution of the water-soluble polymer can be suppressed to suppress a decrease in the ion conductivity in the functional layer regarding the ions contribute to the battery reaction, and the output characteristics of the secondary battery can be improved. If the content proportion of the cross-linkable monomer unit in the water-soluble polymer is not less than the above-mentioned lower limit, an increase in the amount of moisture that may be contained in the functional layer can be suppressed, and the high-temperature cycle characteristics of the secondary battery can be improved. If the content proportion of the cross-linkable monomer unit in the water-soluble polymer is not more than the above-mentioned upper limit, the polymerization stability in the production of the water-soluble polymer can be improved to enable efficient production of the water-soluble polymer. This improves the production efficiency of the secondary battery.

—Other Monomer Units—

The water-soluble polymer may optionally contain other monomer units such as an acid group-containing monomer unit and a vinyl cyanide monomer unit.

Examples of acid group-containing monomers that can be used to form the acid group-containing monomer unit include monomers that have an acid group such as carboxylic acid group-containing monomers, sulfonate group-containing monomers, and phosphate group-containing monomers.

Examples of carboxylic acid group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfonate group-containing monomers include vinyl sulfonic acid, methyl vinyl sulfonic acid, (meth)allyl sulfonic acid, 2-sulfoethyl (meth)acrylate, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)allyl" is used to indicate "allyl" and/or "methallyl", and "(meth)acryloyl" is used to indicate "acryloyl" and/or "methacryloyl".

Of these monomers, carboxylic acid group-containing monomers are preferable, among which, monocarboxylic acids are more preferable, and acrylic acid is further preferable as an acid group-containing monomer.

One acid group-containing monomer may be used individually, or two or more acid group-containing monomers may be used in combination in a freely selected ratio.

The proportion of the acid group-containing monomer unit contained in the water-soluble polymer is preferably 1 mass % or more, and typically 30 mass % or less. If the content proportion of the acid group-containing monomer unit is in the above-mentioned range, the dispersion stability of the composition for a functional layer can be enhanced, and the electrical characteristics of a secondary battery including a functional layer formed using the composition for a functional layer can be further improved.

Examples of vinyl cyanide monomers that can be used to form the vinyl cyanide monomer unit include, but are not specifically limited to, acrylonitrile, methacrylonitrile, α-chloroacrylonitrile, and α-ethylacrylonitrile. One vinyl cyanide monomer may be used individually, or two or more vinyl cyanide monomers may be used in combination in a freely selected ratio.

The water-soluble polymer of the specific composition described above may be optionally mixed with an amine compound. Adding an amine compound to the water-soluble polymer suppresses a possible change in viscosity when storing the composition for a functional layer, and improves the storage stability of the composition for a functional layer. Examples of amine compounds that can be used include, but are not specifically limited to, hydroxylamine sulfate, diethylhydroxylamine, dimethylhydroxylamine, dipropylhydroxylamine, isopropylhydroxyamine, and isothiazoline compound. One amine compound may be used individually, or two or more amine compounds may be used in combination in a freely selected ratio. The blending ratio of the amine compound may be, for example, 0.01 parts by mass or more and 0.5 parts by mass or less per 100 parts by mass of solid content of the water-soluble polymer.

The water-soluble polymer of the specific composition described above may be optionally mixed with a synthetic polymer. Examples of synthetic polymers that can be used include, but are not specifically limited to, salts of polyacrylic acid such as sodium polyacrylate, polyvinyl alcohol, polyethylene oxide, polyvinyl pyrrolidone, copolymers of vinyl alcohol and acrylic acid or a salt of acrylic acid, fully or partially saponified copolymers of vinyl acetate and maleic anhydride, maleic acid, or fumaric acid, modified polyvinyl alcohol, modified polyacrylic acid, polyethylene glycol, polycarboxylic acid, ethylene-vinyl alcohol copolymers, vinyl acetate polymers, and acrylamide polymers having an introduced carboxylic acid group. No specific limitations are placed on the mixing ratio of the synthetic polymer other than being in a range that does not impair the effects achievable by the presently disclosed composition for a functional layer. For example, the mixing ratio may be 100 parts by mass or less per 100 parts by mass of solid content of the water-soluble polymer.

[Degree of Swelling in Electrolyte Solution of Water-Soluble Polymer]

The degree of swelling in electrolyte solution of the water-soluble polymer is preferably more than 1.0 time, more preferably more than 1.15 times, and further preferably more than 1.2 times, and is preferably 2.0 times or less, more preferably 1.8 times or less, and further preferably 1.5 times or less. If the degree of swelling in electrolyte solution of the water-soluble polymer is more than the above-mentioned lower limit, the conductivity of ions contributing to the battery reaction of the functional layer formed using the composition for a functional layer is enhanced in the secondary battery, and the output characteristics of the secondary battery can be improved. If the degree of swelling in electrolyte solution of the water-soluble polymer is more than the above-mentioned lower limit, the heat contraction resistance of the functional layer can be further improved. If the degree of swelling in electrolyte solution of the water-soluble polymer is not more than the above-mentioned upper limit, blocking of a space formed in the functional layer, which is caused by excessive swelling in electrolyte solution of the water-soluble polymer in the functional layer, can be suppressed. This suppresses a decrease in the conductivity of ions contributing to the battery reaction of the functional layer, and improves the output characteristics of the secondary battery.

[Blending Amount of Water-Soluble Polymer]

The amount of the water-soluble polymer included in the presently disclosed composition for a non-aqueous secondary battery functional layer in the case where the non-conductive particles are inorganic particles is preferably 0.1 parts by mass or more, more preferably 0.3 parts by mass or more, and further preferably 0.5 parts by mass or more, and is preferably 5.0 parts by mass or less, more preferably 4.0 parts by mass or less, and further preferably 3.0 parts by mass or less, per 100 parts by mass of the non-conductive particles. The amount of the water-soluble polymer included in the presently disclosed composition for a non-aqueous secondary battery functional layer in the case where the non-conductive particles are organic particles is preferably 0.4 parts by mass or more, more preferably 1.2 parts by mass or more, and further preferably 2 parts by mass or more, and is preferably 20 parts by mass or less, more preferably 16 parts by mass or less, and further preferably 12 parts by mass or less, per 100 parts by mass of the non-conductive particles. If the content of the water-soluble polymer is not less than the above-mentioned lower limit, the composition for a functional layer has appropriate viscosity. Such a composition for a functional layer is not repelled when applied to a substrate in the formation of a functional layer, so that a uniform functional layer can be formed. If the content of the water-soluble polymer is not less than the above-mentioned lower limit, solid components do not precipitate in the composition for a functional layer or do not become uneven when the composition for a functional layer is applied to a substrate in the formation of a functional layer, so that a uniform functional layer can be formed. If the content of the water-soluble polymer is not more than the above-mentioned upper limit, streaks or unevenness are prevented when the composition for a functional layer is applied to a substrate in the formation of a functional layer, so that a uniform functional layer can be formed. If the content of the water-soluble polymer is not more than the above-mentioned upper limit, the obtained functional layer does not have an excessively large space between the non-conductive particles. This enhances the packing density of the non-conductive particles in the functional layer, and improves the heat contraction resistance of the functional layer.

[Method of Producing Water-Soluble Polymer]

The water-soluble polymer may be produced through polymerization of a monomer composition containing the above-mentioned monomers in an aqueous solvent such as water. The content proportion of each monomer in the monomer composition can be set in accordance with the content proportion of the corresponding repeating unit (monomer unit) in the water-soluble polymer.

No specific limitations are placed on the mode of polymerization and a method such as solution polymerization, suspension polymerization, bulk polymerization, or emulsion polymerization can be used. Examples of types of polymerization reactions that can be used include ionic polymerization, radical polymerization, and living radical polymerization.

The polymerization may be carried out with commonly used additives such as emulsifier, dispersant, polymerization initiator, and polymerization aid, and the amount thereof may also be the same as commonly used. The polymerization conditions may be appropriately adjusted in accordance with the polymerization method, the type of polymerization initiator, and the like.

<Water-Insoluble Polymer>

The water-insoluble polymer included in the presently disclosed composition for a non-aqueous secondary battery functional layer is dispersed while maintaining its particulate form in the composition for a non-aqueous secondary battery functional layer, and functions as a binder together with the water-soluble polymer described above. Since the presently disclosed composition for a non-aqueous secondary battery functional layer uses the water-soluble polymer having the above-mentioned specific composition and the water-insoluble polymer satisfying the below-mentioned specific composition and properties in combination as binding components, not only the solid components such as the non-conductive particles included in the composition for a functional layer can be firmly held in the functional layer, but also a minute space can be secured in the functional layer even in a state of being immersed in an electrolyte solution. Such a minute space enhances the ion conductivity of the functional layer, and compensates, to a certain extent, for the influence of possible contraction in the case where the functional layer is heated in association with charging and discharging of the secondary battery. Thus, the presently disclosed composition for a non-aqueous secondary battery functional layer can not only improve the vibration drop-off resistance of the functional layer, but also enhance the heat contraction resistance of the functional layer.

[Composition of Water-Insoluble Polymer]

The water-insoluble polymer is normally a polymer that is insoluble in water. Examples of the water-insoluble polymer include, but are not specifically limited to, known water-insoluble polymers usable as binders in the formation of a functional layer, such as a thermoplastic elastomer. In the present disclosure, the water-insoluble polymer needs to contain an ethylenically unsaturated carboxylic acid monomer unit in a proportion of 1.5 mass % or more and 5.0 mass % or less. The water-insoluble polymer preferably further contains a cross-linkable monomer unit, an aromatic monovinyl monomer unit, and/or a fluorine-containing monomer unit, and may optionally contain other monomer units.

One water-insoluble polymer may be used individually, or two or more water-insoluble polymers may be used in combination.

—Ethylenically Unsaturated Carboxylic Acid Monomer Unit—

Examples of ethylenically unsaturated carboxylic acid monomers that can be used to form the ethylenically unsaturated carboxylic acid monomer unit include an ethylenically unsaturated monocarboxylic acid, an ethylenically unsaturated dicarboxylic acid, and derivatives thereof. Examples of the ethylenically unsaturated monocarboxylic acid include acrylic acid, methacrylic acid, and crotonic acid. Examples of derivatives of the ethylenically unsaturated monocarboxylic acid include 2-ethylacrylic acid, isocrotonic acid, α-acetoxyacrylic acid, β-trans-aryloxyacrylic acid, α-chloro-β-E-methoxyacrylic acid, β-diaminoacrylic acid, and the like.

Examples of the ethylenically unsaturated dicarboxylic acid include maleic acid, fumaric acid, itaconic acid, and the like. Examples of acid anhydrides of the ethylenically unsaturated dicarboxylic acid include maleic anhydride, acrylic anhydride, methylmaleic anhydride, dimethylmaleic anhydride, and the like. Examples of derivatives of the ethylenically unsaturated dicarboxylic acid include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleate. Of these, acrylic acid is preferable. It is possible to use only one type of ethylenically unsaturated carboxylic acid monomer or to use two or more types in combination.

The water-insoluble polymer needs to contain the ethylenically unsaturated carboxylic acid monomer unit in a proportion of 1.5 mass % or more and 5.0 mass % or less. The content of the ethylenically unsaturated carboxylic acid monomer unit in the water-insoluble polymer is preferably 2.0 mass % or more and more preferably 2.5 mass % or more, and is preferably 4.5% or less and more preferably 4.2% or less. If the content proportion of the ethylenically unsaturated carboxylic acid monomer unit in the water-insoluble polymer is not less than the above-mentioned lower limit, the dispersion stability of the water-insoluble polymer in the composition for a functional layer can be improved. If the content proportion of the ethylenically unsaturated carboxylic acid monomer unit in the water-insoluble polymer is not more than the above-mentioned upper limit, an excessive increase in the degree of swelling in electrolyte solution of the water-insoluble polymer is suppressed and thus the output characteristics of the secondary battery can be improved, and also the heat contraction resistance of the functional layer can be improved.

—Aromatic Monovinyl Monomer Unit—

Examples of aromatic monovinyl monomers that can be used to form the aromatic monovinyl monomer unit include styrene, styrenesulfonic acid, α-methylstyrene, and vinyltoluene. Of these monomers, styrene is preferable. One of such aromatic monovinyl monomers may be used individually, or two or more of such aromatic monovinyl monomers may be used in combination.

The content of the aromatic monovinyl monomer unit in the water-insoluble polymer is preferably 10 mass % or more, more preferably 15 mass % or more, further preferably 20 mass % or more, and particularly preferably 35 mass % or more, and is preferably 60 mass % or less, more preferably 55 mass % or less, and further preferably 50 mass % or less. If the content proportion of the aromatic monovinyl monomer unit in the water-insoluble polymer is not less than the above-mentioned lower limit, an excessive increase in the degree of swelling in electrolyte solution of the water-insoluble polymer is suppressed and thus the output characteristics of the secondary battery can be improved, and also the heat contraction resistance of the functional layer can be improved. If the content proportion of the aromatic monovinyl monomer unit in the water-insoluble polymer is not more than the above-mentioned upper limit, the high-temperature cycle characteristics of the secondary battery can be improved.

—Cross-Linkable Monomer Unit—

Examples of cross-linkable monomers that can be used to form the cross-linkable monomer unit include the same cross-linkable monomers as the water-soluble polymer described above. In the production of the water-insoluble polymer, it is preferable to use a hydrophilic cross-linkable monomer and a hydrophobic cross-linkable monomer in combination, and particularly preferable to use allyl glycidyl ether and allyl methacrylate in combination.

The content proportion of the cross-linkable monomer unit in the water-insoluble polymer is preferably 0.01 mass % or more, more preferably 0.05 mass % or more, further preferably 0.1 mass % or more, and particularly preferably 1.5 mass % or more, and is preferably 4.0 mass % or less, more preferably 3.5 mass % or less, and further preferably 3.0% or less. If the content proportion of the cross-linkable monomer unit in the water-insoluble polymer is not less than the above-mentioned lower limit, the strength of the water-insoluble polymer is improved to suppress an excessive increase in the degree of swelling in electrolyte solution, so that the output characteristics of the secondary battery can be improved, and also the heat contraction resistance of the functional layer can be improved. If the content proportion of the cross-linkable monomer unit in the water-insoluble polymer is not more than the above-mentioned upper limit, the high-temperature cycle characteristics of the secondary battery can be improved.

—Fluorine-Containing Monomer Unit—

Examples of fluorine-containing monomers that can be used to form the fluorine-containing monomer unit include fluorine-containing olefins such as vinylidene fluoride, tetrafluoroethylene, hexafluoropropylene, trifluorochloroethylene, and perfluoroalkyl vinyl ethers; and fluorine-containing (meth)acrylates expressed by following general formula (1):

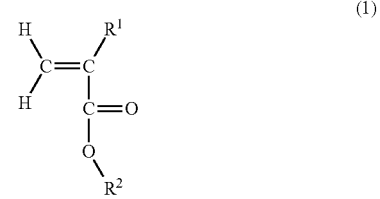

(where $R^1$ is a hydrogen atom or a methyl group, and $R^2$ is a hydrocarbon group containing a fluorine atom and having a carbon number of 1 to 18.)

Examples of $R^2$ in the general formula (1) include an alkyl fluoride group having a carbon number of 1 to 12, an aryl fluoride group having a carbon number of 6 to 16, and an aralkyl fluoride group having a carbon number of 7 to 18. Of these, an alkyl fluoride group having a carbon number of 1 to 12 is preferable. Preferable examples of $R^2$ in the general formula (1) include a 2,2,2-trifluoroethyl group, a 2,2,3,3,3-pentafluoropropyl group, 1,1,1,3,3,3-hexafluoropropane-2-yl group, a β-(perfluorooctyl)ethyl group, a 2,2,3,3-tetrafluoropropyl group, a 2,2,3,4,4,4-hexafluorobutyl group, a 1H,1H,5H-octafluoropentyl group, a 1H,1H,9H-perfluoro-1-nonyl group, a 1H,1H,11H-perfluoroundecyl group, and a perfluorooctyl group.

Of fluorine-containing olefins, vinylidene fluoride and vinylidene hexafluoride are preferable. Of fluorine-containing (meth)acrylates that can be represented by the general formula (1), 2,2,2-trifluoroethyl methacrylate, 2,2,2-trifluoroethyl acrylate, and 1,1,1,3,3,3-hexafluoroisopropyl acrylate are preferable.

Of fluorine-containing monomer units, it is particularly preferable to use a fluorine atom-containing (meth)acrylate represented by the general formula (1) in the production of the water-insoluble polymer. This suppresses an excessive increase in the degree of swelling in electrolyte solution of the water-insoluble polymer, so that the output characteristics of the secondary battery can be improved, and also the heat contraction resistance of the functional layer can be improved. In the case of using a fluorine atom-containing (meth)acrylate represented by the general formula (1), the content proportion of a monomer unit derived from the fluorine atom-containing (meth)acrylate represented by the general formula (1) in the water-insoluble polymer is preferably 5.0 mass % or less, more preferably 4.0 mass % or less, and further preferably 3.0 mass % or less per 100 mass % of all monomer units contained in the water-insoluble polymer, in terms of improving the high-temperature cycle characteristics of the secondary battery including the obtained functional layer.

—Other Monomer Units—

The water-insoluble polymer may optionally contain other monomer units, in addition to the above-mentioned essential or preferable monomer units. Examples of such monomer units include, but are not specifically limited to, a (meth)acrylic acid ester monomer unit, and an acid group-containing monomer unit other than the above-mentioned ethylenically unsaturated carboxylic acid monomer unit. Examples of (meth)acrylic acid ester monomers that can be used to form the (meth)acrylic acid ester monomer unit include, but are not specifically limited to, (meth)acrylic acid alkyl esters such as methyl acrylate, ethyl acrylate, butyl acrylate, methyl methacrylate, ethyl methacrylate, and 2-ethylhexyl acrylate. Of these, 2-ethylhexyl acrylate is preferable. One of such (meth)acrylic acid ester monomers may be used individually, or two or more of such (meth)acrylic acid ester monomers may be used in combination. Examples of acid group-containing monomer units other than the ethylenically unsaturated carboxylic acid monomer unit include the same acid group-containing monomers (e.g. sulfonate group-containing monomers, phosphate group-containing monomers) as the water-soluble polymer described above.

[Properties of Water-Insoluble Polymer]

The volume-average particle diameter of the water-insoluble polymer is preferably 0.01 μm or more, more preferably 0.05 μm or more, and further preferably 0.10 μm or more, and is preferably 0.30 μm or less, more preferably 0.28 μm or less, and further preferably 0.25 μm or less. If the volume-average particle diameter of the water-insoluble polymer is not less than the above-mentioned lower limit, excessive blocking of the functional layer is prevented to suppress a decrease in the ion conductivity of the functional layer and an increase in the internal resistance of the secondary battery including the functional layer, so that the rate characteristics of the secondary battery including the functional layer can be improved. If the volume-average particle diameter of the water-insoluble polymer is not less than the above-mentioned lower limit, the high-temperature cycle characteristics of the secondary battery can be improved. If the volume-average particle diameter of the water-insoluble polymer is not more than the above-mentioned upper limit, the water-insoluble polymer is favorably dispersed in the functional layer and the water-insoluble polymer located in the space between the non-conductive particles firmly holds the non-conductive particles in the functional layer. This improves the vibration drop-off resistance in electrolyte solution of the functional layer, and keeps the non-conductive particles from dropping off (i.e. dusting) the functional layer in a state of not being immersed in an electrolyte solution. If the volume-average particle diameter of the water-insoluble polymer is not more than the above-mentioned upper limit, the water-insoluble polymer located near the surface layer of the functional layer improves the adhesiveness of the functional layer, so that the peel strength of the functional layer can be improved, and further the heat contraction resistance can be improved.

Herein, the "volume-average particle diameter of the water-insoluble polymer" represents a particle diameter (D50) at which, in a particle diameter distribution (volume basis) measured by laser diffraction, the cumulative volume calculated from a small diameter end of the distribution reaches 50%. In the case of using a plurality of types of water-insoluble polymers in combination, a volume-average particle diameter (D50) measured for a dispersion liquid containing the plurality of types of water-insoluble polymers in the same ratios as those contained in the composition for a functional layer by the above-mentioned measurement method is preferably in the above-mentioned range.

The volume-average particle diameter of the water-insoluble polymer is preferably 0.15 times or more, and is preferably 0.60 times or less, and more preferably 0.48 times or less the volume-average particle diameter of the non-conductive particles. If the ratio between the volume-average particle diameter of the water-insoluble polymer and the volume-average particle diameter of the non-conductive particles is in the above-mentioned range, the water-insoluble polymer located in the space between the non-conductive particles firmly holds the non-conductive particles in the functional layer. This improves the vibration drop-off resistance in electrolyte solution of the functional layer.

The glass-transition temperature of the water-insoluble polymer is preferably 30° C. or less, more preferably 20° C. or less, and further preferably 15° C. or less, and is preferably −50° C. or more, more preferably −40° C. or more, and further preferably −20° C. or more. If the glass-transition temperature of the water-insoluble polymer is not more than the above-mentioned upper limit, the composition for a functional layer can be handled easily. If the glass-transition temperature of the water-insoluble polymer is not less than the above-mentioned lower limit, the binding ability of the functional layer can be enhanced to improve the peel strength.

Herein, the "glass-transition temperature of the water-insoluble polymer" can be measured by differential scanning calorimetric analysis in accordance with JIS K7121.

The degree of swelling in electrolyte solution of the water-insoluble polymer needs to be more than 1.0 time and is preferably more than 1.15 times and more preferably more than 1.2 times, and needs to be 3.0 times or less and is preferably 2.0 times or less, more preferably 1.95 times or less, and further preferably 1.9 times or less. If the degree of swelling in electrolyte solution of the water-insoluble polymer is more than the above-mentioned lower limit, the ions contributing to the battery reaction of the functional layer easily transmit in the electrolyte solution, so that the output characteristics of the secondary battery can be improved. If the degree of swelling in electrolyte solution of the water-insoluble polymer is more than the above-mentioned lower limit, the heat contraction resistance of the functional layer can be improved. If the degree of swelling in electrolyte solution of the water-insoluble polymer is not more than the above-mentioned upper limit, blocking of the flow path of the ions contributing to the battery reaction, which is caused by excessive swelling of the water-insoluble polymer in the functional layer, can be suppressed, and thus the output characteristics of the secondary battery can be improved. If the degree of swelling in electrolyte solution of the water-insoluble polymer is not more than the above-mentioned upper limit, an excessive decrease in the non-conductive particle holding ability of the water-insoluble polymer, which is caused by excessive swelling of the water-insoluble polymer, can be suppressed to improve the vibration drop-off resistance in electrolyte solution, thus improving the high-temperature cycle characteristics of the secondary battery.

The degree of swelling in electrolyte solution of the water-insoluble polymer can be, for example, controlled by adjusting the composition of the water-insoluble polymer, without being specifically limited thereto. Specifically, the degree of swelling in electrolyte solution of the water-insoluble polymer may be controlled by adjusting the blending amount of the aromatic monovinyl monomer, the cross-linkable monomer, and/or the fluorine atom-containing (meth)acrylate represented by the general formula (1) used in the production of the water-insoluble polymer. A desired degree of swelling in electrolyte solution of the water-insoluble polymer can thus be obtained.

The water-insoluble polymer may have a core-shell structure having a core portion and a shell portion composed of polymers different in properties. In such a case, at least the shell portion may satisfy the above-mentioned requirements such as the glass-transition temperature and the degree of swelling in electrolyte solution.

[Blending Amount of Water-Insoluble Polymer]

The amount of the water-insoluble polymer included in the presently disclosed composition for a non-aqueous secondary battery functional layer in the case where the non-conductive particles are inorganic particles is preferably 0.2 parts by mass or more, more preferably 0.5 parts by mass or more, and further preferably 1.0 part by mass or more, and is preferably 10 parts by mass or less, more preferably 7 parts by mass or less, and further preferably 5 parts by mass or less, per 100 parts by mass of the non-conductive particles. The amount of the water-insoluble polymer included in the presently disclosed composition for a non-aqueous secondary battery functional layer in the case where the non-conductive particles are organic particles is preferably 0.8 parts by mass or more, more preferably 2.0 parts by mass or more, and further preferably 4.0 parts by mass or more, and is preferably 40 parts by mass or less, more preferably 28 parts by mass or less, and further preferably 20 parts by mass or less, per 100 parts by mass of the non-conductive particles. If the content of the water-insoluble polymer is not less than the above-mentioned lower limit, the non-conductive particles are kept from dropping off the functional layer in a state of not being immersed in an electrolyte solution, so that the peel strength of the functional layer can be improved. If the content of the water-insoluble polymer is not less than the above-mentioned lower limit, the vibration drop-off resistance of the functional layer can be improved. If the content of the water-insoluble polymer is not more than the above-mentioned upper limit, an excessive increase in the Gurley value of the functional layer can be suppressed to suppress an increase in the internal resistance of the secondary battery and a decrease in the output characteristics of the secondary battery.

The content of the water-insoluble polymer in the functional layer composition is preferably 0.1 times or more, more preferably 0.3 times or more, and further preferably 0.7 times or more, and is preferably 2.5 times or less, more preferably 2.2 times or less, and further preferably 2.0 times or less the content of the water-soluble polymer. If the ratio of the content of the water-insoluble polymer to the content of the water-soluble polymer (water-insoluble polymer/water-soluble polymer) is not less than the above-mentioned lower limit, the non-conductive particles are kept from dropping off the functional layer in a state of not being immersed in an electrolyte solution, so that the peel strength of the functional layer can be improved. If the value of (water-insoluble polymer/water-soluble polymer) is not less than the above-mentioned lower limit, the vibration drop-off resistance of the functional layer can be improved. Moreover, the heat contraction resistance of the functional layer can be improved. If the value of (water-insoluble polymer/water-soluble polymer) is not more than the above-mentioned upper limit, an excessive increase in the Gurley value of the functional layer can be suppressed to suppress an excessive increase in the internal resistance of the secondary battery including the functional layer, so that the output characteristics of the secondary battery can be improved.

The content of each of the water-insoluble polymer and the water-soluble polymer in the composition for a functional layer can be, for example, measured in the following manner. For the content of the water-soluble polymer, the composition for a functional layer is filtered to remove solid components, and the content ratios of the water-soluble polymer, the dispersant, and the wetting agent of the obtained filtrate are quantitated using liquid chromatography. Moreover, part of the filtrate is dried and the weight of the dried product is measured, to calculate the content of the water-soluble polymer in the filtrate per unit quantity. For the content of the water-insoluble polymer, the solid components obtained by filtration are redispersed in a solvent such as water and subjected to centrifugal separation, to separate the non-conductive particles and the water-insoluble polymer included in the solid components. A fraction including the water-insoluble polymer is then collected and dried and the weight of the dried product is measured, to calculate the content of the water-insoluble polymer.

[Method of Producing Water-Insoluble Polymer]

The water-insoluble polymer may be produced through polymerization of a monomer composition containing monomers used in the polymerization of the water-insoluble polymer in an aqueous solvent such as water. The content proportion of each monomer in the monomer composition can be set in accordance with the content proportion of the corresponding repeating unit (monomer unit) in the water-insoluble polymer.

No specific limitations are placed on the mode of polymerization and a method such as solution polymerization, suspension polymerization, bulk polymerization, or emulsion polymerization can be used. Examples of types of polymerization reactions that can be used include ionic polymerization, radical polymerization, and living radical polymerization.

The polymerization may be carried out with commonly used additives such as emulsifier, dispersant, polymerization initiator, and polymerization aid, and the amount thereof may also be the same as commonly used. The polymerization conditions may be appropriately adjusted in accordance with the polymerization method, the type of polymerization initiator, and the like.

<Additives>

The composition for a non-aqueous secondary battery functional layer may contain other optional components besides the components described above. Commonly known examples of such other components can be used without any specific limitations so long as the battery reactions are not affected. One of such other components may be used individually, or two or more of such other components may be used in combination.

Examples of these other components include known additives such as dispersants and wetting agents.

[Dispersant]

Examples of dispersants that can be used include, but are not specifically limited to, polycarboxylic acid, sodium polycarboxylate, ammonium polycarboxylate, a polycarboxylic acid-sulfonic acid copolymer, a polycarboxylic acid-sulfonic acid copolymer sodium, and a polycarboxylic acid-sulfonic acid copolymer ammonium. Of these, a polycarboxylic acid-sulfonic acid copolymer is preferable.

The amount of the dispersant used in the case where the non-conductive particles are inorganic particles is preferably 0.1 parts by mass or more, more preferably 0.5 parts by mass or more, and further preferably 1.0 part by mass or more, and is preferably 5 parts by mass or less, more preferably 4 parts by mass or less, and further preferably 3.5 parts by mass or less, per 100 parts by mass of the non-conductive particles. The amount of the dispersant used in the case where the non-conductive particles are organic particles is preferably 0.4 parts by mass or more, more preferably 2.0 parts by mass or more, and further preferably 4.0 parts by mass or more, and is preferably 20 parts by mass or less, more preferably 16 parts by mass or less, and further preferably 14 parts by mass or less, per 100 parts by mass of the non-conductive particles. If the amount of the dispersant used is not less than the above-mentioned lower limit, the dispersion stability of the composition for a functional layer can be sufficiently improved to appropriately improve the packing density of the non-conductive particles in the functional layer formed using the composition for a functional layer. This enhances the strength of the functional layer while maintaining its flexibility, and improves the heat contraction resistance. If the amount of the dispersant used is not more than the above-mentioned upper limit, the amount of moisture remaining in the functional layer formed using the composition for a non-aqueous secondary battery functional layer can be reduced to improve the high-temperature cycle characteristics of the secondary battery.

The weight-average molecular weight of the dispersant is preferably 100,000 or less. If the weight-average molecular weight of the dispersant is 100,000 or less, an excessive increase in the viscosity of the composition for a functional layer can be suppressed to improve the handleability and coatability of the composition for a functional layer. Herein, the "weight-average molecular weight of the dispersant" can be measured by a measurement method described in the EXAMPLES section of the present specification.

The degree of swelling in electrolyte solution of the dispersant is typically 1.1 times or more and 3.0 times or less.

[Wetting Agent]

Examples of wetting agents that can be used include, but are not specifically limited to, a nonionic surfactant and an anionic surfactant. Of these, a nonionic surfactant is preferable. The weight-average molecular weight of the wetting agent is preferably 100,000 or less. Herein, the "weight-average molecular weight of the wetting agent" can be measured by a measurement method described in the EXAMPLES section of the present specification.

The amount of the wetting agent used in the case where the non-conductive particles are inorganic particles is preferably 0.05 parts by mass or more, more preferably 0.1 parts by mass or more, and further preferably 0.15 parts by mass or more, and is preferably 2 parts by mass or less, more preferably 1.5 parts by mass or less, and further preferably 1 part by mass or less, per 100 parts by mass of the non-conductive particles. The amount of the wetting agent used in the case where the non-conductive particles are organic particles is preferably 0.2 parts by mass or more, more preferably 0.4 parts by mass or more, and further preferably 0.6 parts by mass or more, and is preferably 8 parts by mass or less, more preferably 6 parts by mass or less, and further preferably 4 parts by mass or less, per 100 parts by mass of the non-conductive particles. If the amount of the wetting agent used is not less than the above-mentioned lower limit, the wettability for the substrate can be improved to suppress repelling when applying the composition for a functional layer to the substrate, as a result of which the functional layer can be formed favorably. If the amount of the wetting agent used is not more than the above-mentioned upper limit, an excessive increase in the Gurley value of the functional layer can be suppressed to suppress an increase in the internal resistance of the secondary battery including the functional layer, so that the output characteristics of the secondary battery can be improved.

<Dispersion Medium>

As the dispersion medium of the presently disclosed composition for a non-aqueous secondary battery functional layer, water is typically used. The dispersion medium may be a mixture of water and another solvent, as long as the water-soluble polymer can be dissolved and the water-insoluble polymer can be maintained in a particulate state. Examples of the other solvent include, but are not specifically limited to, cyclic aliphatic hydrocarbon compounds such as cyclopentane and cyclohexane; aromatic hydrocarbon compounds such as toluene and xylene; ketone compounds such as ethyl methyl ketone and cyclohexanone; ester compounds such as ethyl acetate, butyl acetate, γ-butyrolactone, and ε-caprolactone; nitrile compounds such as acetonitrile and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N-dimethylformamide. One of such solvents may be used individually, or two or more of such solvents may be used in combination in a freely selected ratio.

<Method of Producing Composition for Non-Aqueous Secondary Battery Functional Layer>

The presently disclosed composition for a non-aqueous secondary battery functional layer can be obtained by mixing the above-mentioned non-conductive particles, water-soluble polymer, water-insoluble polymer, and optional additives used as necessary in the presence of a dispersion medium such as water, without particular limitations.

Although no specific limitations are placed on the mixing method and the mixing order of the above-mentioned components, the mixing is preferably performed using a disperser as a mixing device to efficiently disperse the components. The disperser is preferably a device that can homogeneously disperse and mix the components. Examples of such devices include a ball mill, a sand mill, a pigment disperser, a grinding machine, an ultrasonic disperser, a homogenizer, and a planetary mixer.

<Properties of Composition for Non-Aqueous Secondary Battery Functional Layer>

The solid content concentration of the presently disclosed composition for a non-aqueous secondary battery functional layer is preferably 35 mass % or more and more preferably 40 mass % or more, and is preferably 65 mass % or less, more preferably 60 mass % or less, and further preferably 55 mass % or less. If the solid content concentration is not less than the above-mentioned lower limit, favorable coatability can be achieved, and the composition for a functional layer has appropriate settleability to suppress repelling during application. If the solid content concentration is not more than the above-mentioned upper limit, the composition for a functional layer has appropriate viscosity to enhance the leveling performance of the composition for a functional layer and enable uniform application.

The viscosity of the composition for a functional layer is preferably 10 mPa·s or more and 100 mPa·s or less. If the viscosity of the composition for a functional layer is in the above-mentioned range, the coatability of the composition for a functional layer can be improved sufficiently. Herein, the "viscosity of the composition for a non-aqueous secondary battery functional layer" is measured by a B-type viscometer at a temperature of 25° C. and a rotational speed of 60 rpm. The viscosity of the composition for a non-aqueous secondary battery functional layer can be adjusted by adjusting the molecular weight of the water-soluble polymer and the content of each component in the composition for a non-aqueous secondary battery functional layer.

(Functional Layer for Non-Aqueous Secondary Battery)

The presently disclosed functional layer for a non-aqueous secondary battery is formed from the composition for a non-aqueous secondary battery functional layer described above. For example, the presently disclosed functional layer for a non-aqueous secondary battery may be formed by applying the composition for a functional layer onto a surface of a suitable substrate to form an applied film and then drying the applied film. Thus, the presently disclosed functional layer for a non-aqueous secondary battery is a dried product of the composition for a non-aqueous secondary battery functional layer, and normally contains the non-conductive particles, the water-soluble polymer having a degree of swelling in electrolyte solution of more than 1.0 time and 3.0 times or less, the water-insoluble polymer having a volume-average particle diameter of 0.01 μm or more and 0.30 μm or less, and optional additives. In a situation in which the non-conductive particles, the water-soluble polymer, and/or the water-insoluble polymer contains a cross-linkable monomer unit, such a polymer containing the cross-linkable monomer unit may be cross-linked, for example, in the drying of the composition for a non-aqueous secondary battery functional layer or in optional heat treatment performed after the drying (in other words, the functional layer for a non-aqueous secondary battery may contain a cross-linked product of the non-conductive particles, the water-soluble polymer, and/or the water-insoluble polymer).

Since the presently disclosed functional layer for a non-aqueous secondary battery is formed using the composition for a non-aqueous secondary battery functional layer described above, the presently disclosed functional layer for a non-aqueous secondary battery is excellent in vibration drop-off resistance in electrolyte solution and heat contraction resistance. A secondary battery including such a functional layer has improved electrical characteristics.

<Substrate>

The substrate onto which the composition for a functional layer is applied is not limited. For example, an applied film of the composition for a functional layer may be formed on a surface of a detachable substrate, the applied film may be dried to form a functional layer, and the detachable substrate may be peeled from the functional layer. The functional layer peeled from the detachable substrate as described above can be used in the formation of battery components of a secondary battery as a free-standing film. In detail, the functional layer peeled from the detachable substrate may be stacked on a separator substrate to form a separator including the functional layer. Alternatively, the functional layer peeled from the detachable substrate may be stacked on an electrode substrate to form an electrode including the functional layer.

However, from a viewpoint of omitting a step of peeling the functional layer and improving the production efficiency of battery components, it is preferable to use a separator substrate or an electrode substrate as the substrate. The functional layer provided on the separator substrate or electrode substrate can be suitably used as a protective layer for improving the heat resistance, strength, and so forth of the separator or electrode.

[Separator Substrate]

Although no specific limitations are placed on the separator substrate, the separator substrate may for example be a known separator substrate such as an organic separator substrate. Herein, the organic separator substrate is a porous member made from an organic material, and may for example be a fine porous membrane or non-woven fabric including a polyolefin resin such as polyethylene or polypropylene, an aromatic polyamide resin, or the like. A fine porous membrane or non-woven fabric made from polyethylene is preferable due to having excellent strength. Although the thickness of the separator substrate can be freely set, the thickness is preferably 5 μm or more and 30 μm or less, more preferably 5 μm or more and 20 μm or less, and further preferably 5 μm or more and 18 μm or less. If the thickness of the separator substrate is 5 μm or more, sufficient safety can be obtained. If the thickness of the separator substrate is 30 μm or less, a decrease in ion conductivity can be suppressed to suppress a decrease in the output characteristics of the secondary battery, and an increase in the heat contraction force of the separator substrate can be suppressed to enhance the heat resistance.

[Electrode Substrate]

The electrode substrate (positive/negative electrode substrate) is not specifically limited and may, for example, be an electrode substrate obtained by forming an electrode mixed material layer on a current collector.

Herein, the current collector, an electrode active material (positive/negative electrode active material) in the electrode mixed material layer, and a binder for an electrode mixed material layer (binder for a positive/negative electrode mixed material layer), and the method by which the electrode mixed material layer is formed on the current collector may be known examples thereof such as described, for example, in JP 2013-145763 A.

<Method of Forming Functional Layer for Non-Aqueous Secondary Battery>

The method by which the functional layer is formed on the above-mentioned substrate such as a separator substrate or an electrode substrate may for example be:

1) A method in which the presently disclosed composition for a non-aqueous secondary battery functional layer is applied onto the surface of a separator substrate or an electrode substrate (the surface at the electrode mixed material layer side in the case of an electrode substrate; the same also applies below) and is then dried;

2) A method in which a separator substrate or an electrode substrate is immersed in the presently disclosed composition for a non-aqueous secondary battery functional layer and the resultant product is then dried; or 3) A method in which the presently disclosed composition for a non-aqueous secondary battery functional layer is applied onto a detachable substrate and is dried to produce a functional layer that is then transferred onto the surface of a separator substrate or an electrode substrate.

Of these methods, the method described in 1) is particularly preferable since it allows the thickness of the functional layer to be easily controlled. The method described in 1) more specifically includes a step of applying the composition for a functional layer onto a substrate (application step) and a step of drying the applied composition for a functional layer on the substrate to form a functional layer (functional layer formation step).

[Application Step]

No specific limitations are placed on the method by which the composition for a functional layer is applied onto the substrate in the application step. For example, a method such as doctor blading, reverse roll coating, direct roll coating, gravure coating, extrusion coating, or brush coating may be used.

[Functional Layer Formation Step]

The composition for a functional layer that has been applied onto the substrate may be dried by any commonly known method in the functional layer formation step without any specific limitations. For example, drying may be carried out through drying by warm, hot, or low-humidity air; drying in a vacuum; or drying by irradiation with infrared light or electron beams. Although no specific limitations are placed on the drying conditions, the drying temperature is preferably 50° C. to 150° C., and the drying time is preferably 5 minutes to 30 minutes.

<Thickness of Functional Layer>

The thickness of the functional layer formed using the presently disclosed composition for a non-aqueous secondary battery functional layer is preferably 0.5 μm or more and 5 μm or less. If the thickness of the functional layer is 0.5 μm or more, the protective function can be further enhanced, so that the heat resistance and strength of a battery component provided with the functional layer can be further improved. If the thickness of the functional layer is 5 μm or less, the secondary battery can exhibit excellent output characteristics.

(Battery Component Including Functional Layer)

A battery component (separator or electrode) including the presently disclosed functional layer may include, in addition to the separator substrate or electrode substrate and the presently disclosed functional layer, components other than the presently disclosed functional layer, as long as the intended effect is not significantly compromised.

Examples of the components other than the presently disclosed functional layer are not specifically limited as long as they do not correspond to the presently disclosed functional layer, and include an adhesive layer provided on the presently disclosed functional layer for adhesion between battery components.

(Non-Aqueous Secondary Battery)

The presently disclosed non-aqueous secondary battery includes the presently disclosed functional layer for a non-aqueous secondary battery described above. More specifically, the presently disclosed non-aqueous secondary battery includes a positive electrode, a negative electrode, a separator, and an electrolyte solution, and at least one of the positive electrode, the negative electrode, and the separator as battery components includes the functional layer for a non-aqueous secondary battery. The presently disclosed non-aqueous secondary battery can exhibit excellent battery characteristics (e.g. high-temperature cycle characteristics and output characteristics).

<Positive Electrode, Negative Electrode, and Separator>

At least one of the positive electrode, the negative electrode, and the separator used in the presently disclosed secondary battery includes the presently disclosed functional layer. Specifically, an electrode produced by providing the presently disclosed functional layer on an electrode substrate that is obtained by forming an electrode mixed material layer on a current collector can be used as a functional layer-containing positive electrode or a functional layer-containing negative electrode. Moreover, a separator produced by providing the presently disclosed functional layer on a separator substrate can be used as a functional layer-containing separator. The electrode substrate and the separator substrate can be any of the examples previously described in the "Functional layer for non-aqueous secondary battery" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolyte Solution>

The electrolyte solution is normally an organic electrolyte solution obtained by dissolving a supporting electrolyte in an organic solvent. For example, in a lithium ion secondary battery, the supporting electrolyte is a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $Lipf_6$, $LiClO_4$, and $CF_3SO_3Li$ are preferred as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. In the case of a lithium ion secondary battery, suitable examples of the organic solvent include: carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region. Normally, as the viscosity of the solvent being used is lower, the lithium ion conductivity tends to increase. Hence, the conductivity of lithium ions can be adjusted by the type of solvent.

The concentration of the electrolyte in the electrolyte solution can be adjusted as needed. Any additive known in the art may be added to the electrolyte solution.

(Method of Producing Non-Aqueous Secondary Battery)

The presently disclosed non-aqueous secondary battery described above can for example be produced by overlapping the positive electrode and the negative electrode via the separator, performing rolling, folding, or the like of the resultant product as required to place the resultant product in a battery container, pouring the electrolyte solution into the battery container, and sealing the battery container. At least one of the positive electrode, the negative electrode, and the separator is a functional layer-equipped member. An expanded metal, an overcurrent prevention element such as a fuse or a PTC element, a lead plate, or the like may be placed in the battery container as required in order to prevent pressure from increasing inside the battery container and prevent overcharging or overdischarging from occurring. The shape of the battery may for example be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%", "ppm", and "parts" used in expressing quantities are by mass, unless otherwise specified.

Moreover, in the case of a polymer that is produced through copolymerization of a plurality of types of monomers, the proportion of a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to measure the volume-average particle diameter (the non-conductive particles and the water-insoluble polymer), the weight-average molecular weight (the dispersant and the wetting agent), the degree of swelling in electrolyte solution of each of the water-soluble polymer and the water-insoluble polymer, and the glass-transition temperature of the water-insoluble polymer. Moreover, the following methods were used to evaluate the dispersion stability of the composition for a functional layer, the heat contraction resistance, vibration drop-off resistance, and peel strength of the functional layer, and the output characteristics and high-temperature cycle characteristics of the secondary battery.

<Volume-Average Particle Diameter of Non-Conductive Particles>

For the non-conductive particles prepared or produced in each of the examples and comparative examples, a water dispersion with a solid content concentration of 0.1 mass % was produced, and the particle size distribution (volume basis) was obtained by a laser diffraction particle diameter distribution measurement device (SALD-7100 produced by Shimadzu Corporation). A particle diameter at which, in the obtained particle size distribution, the cumulative volume calculated from a small diameter end of the distribution reaches 50% was taken to be the volume-average particle diameter.

<Weight-Average Molecular Weight>

The weight-average molecular weight of each of the dispersant and the wetting agent was measured using gel permeation chromatography (GPC). Specifically, for the dispersant and the wetting agent produced or prepared in each of the examples and comparative examples, an aqueous solution with a solid content concentration of 0.05 mass % was produced as a measurement sample. A calibration curve was then created with a standard substance, to calculate the weight-average molecular weight in terms of the standard substance. The measurement conditions are as follows. The results are shown in Table 1.

Device: gel permeation chromatography (produced by Tosoh Corporation, pump: product name "DP-8020", autosampler: product name "AS-8020", detector: product name "RI-8020").

Column: produced by Showa Denko K.K., product name "Shodex OHpak (SB-G, SB-807HQ, SB-806MHQ)".

Mobile phase: 0.1 M Tris buffer (pH 9.0)+0.1 M potassium chloride.

Flow rate: 0.5 mL/minute.
Injection amount: 0.2 mL.
Temperature: 40° C.
Detector: differential refractive index detector (RI).
Standard substance: monodisperse pullulan.

<Degree of Swelling in Electrolyte Solution>

The electrolyte solution used to measure the degree of swelling in electrolyte solution was obtained by dissolving $LiPF_6$ as a supporting electrolyte in a concentration of 1 mol/L in a mixed solvent of ethylene carbonate and ethyl methyl carbonate (volume mixing ratio: ethylene carbonate (EC)/ethyl methyl carbonate (EMC)=3/7; SP value 18.9 $(cal/cm^3)^{1/2}$).

The water-soluble polymer and the water-insoluble polymer produced in each of the examples and comparative examples were prepared. A solution or dispersion liquid thereof was poured into a polytetrafluoroethylene petri dish and was dried for 48 hours at a temperature of 25° C. to obtain a film of 0.5 mm in thickness.

A specimen was obtained by cutting a 1 cm square from the obtained film. The weight of the specimen was measured, and taken to be $W_0$. The specimen was then immersed in the electrolyte solution for 72 hours at a temperature of 60° C. Thereafter, the specimen was removed from the electrolyte solution, the electrolyte solution on the surface of the specimen was wiped off, and the weight $W_1$ of the specimen after immersion was measured.

The weights $W_0$ and $W_1$ were used to calculate the degree of swelling S (times) according to $S=W_1/W_0$. The results are shown in Table 1.

<Glass-Transition Temperature of Water-Insoluble Polymer>

For the water-insoluble polymer produced in each of the examples and comparative examples, a differential scanning calorimeter (DSC) curve was measured using a differential themoanalyzer (produced by SII Technology, EXSTAR DSC6220) in accordance with JIS K7121. Specifically, 10 mg of the dried measurement sample was weighed into an aluminum pan and a DSC curve was measured with respect to the measurement sample under normal temperature and humidity with a measurement temperature range of −100° C. to 100° C. and a heating rate of 10° C./minute, and using an empty aluminum pan as a reference. The glass-transition temperature of the water-insoluble polymer was determined from an intersection point of a base line directly before a heat absorption peak on the DSC curve at which a derivative signal (DDSC) was at least 0.05 mW/minute/mg in a heating process and a tangent to the DSC curve at a first inflection point to appear after the heat absorption peak.

<Dispersion Stability of Composition for Functional Layer>

An amount of 200 g of the composition for a functional layer produced in each of the examples and comparative examples was weighed and filtered through a mesh having a pore size of 10 μm, and the amount of a residue on the mesh was weighed (weight a). Next, the filtrate was placed in a cup of 130 mm in diameter and 100 mm in height and was stirred for 20 minutes at 3,000 rpm using a disper blade (blade diameter: 60 mm). After the stirring, the filtrate was filtered through a mesh having a pore size of 10 μm, and the amount of a residue on the mesh was weighted (weight b). The value obtained by subtracting the weight a from the weight b was taken to be the amount of residue, and the ratio of the residue to the whole composition for a functional layer (200 g) was calculated. The dispersion stability of the composition for a functional layer was then evaluated based on the following criteria. A smaller amount of residue indicates better dispersion stability of the composition for a functional layer and lower probability of reaggregation of the dispersed components.

A: Amount of residue of 50 ppm or less.
B: Amount of residue of 50 ppm or more.

<Heat Contraction Resistance of Functional Layer>

A specimen was prepared by cutting a square shape of 5 cm in width by 5 cm in length from the functional layer-equipped separator produced in each of the examples and comparative examples. The specimen was packed in an aluminum packing case of 9 cm in width by 10 cm in length in a state of being folded in the length direction. The aluminum packing case was filled with 600 μl of an electrolyte solution (solvent: ethylene carbonate (EC)/ethyl methyl carbonate (EMC)=70/30 (volume ratio), electrolyte: $LiPF_6$ of 1 M in concentration), and its opening was sealed with a vacuum sealer. The aluminum case was then closed by heat sealing at 150° C. to tightly seal the opening. The specimen was left for 1 hour in a 150° C. thermostatic bath, and then the aluminum packing was opened and the functional layer-equipped separator therein was removed. The change in area of the square shape of the removed functional layer-equipped separator was determined thereafter as a heat contraction rate, which was evaluated based on the following criteria. A lower heat contraction rate indicates better heat contraction resistance of the functional layer-equipped separator.

A: Heat contraction rate of less than 5%.
B: Heat contraction rate of 5% or more and less than 10%.
C: Heat contraction rate of 10% or more and less than 20%.
D: Heat contraction rate of 20% or more.

<Vibration Drop-Off Resistance>

The functional layer-equipped separator produced in each of the examples and comparative examples was cut out to a size of 5×5 $cm^2$, and the weight $M_0$ was measured. Next, the functional layer-equipped separator that had been cut out was immersed in an electrolyte solution (solvent: EC/EMC=3/7 (volume ratio)), and subjected to ultrasonic vibration for 10 minutes at 60° C. and 30 kHz. The functional layer-equipped separator was subsequently removed and dried for 10 hours at 60° C., after which the weight $M_1$ was measured. The vibration drop-off rate ΔM was calculated from ΔM (%)=$(M_0-M_1)/M_0$×100, and evaluated based on the following criteria. A smaller ΔM indicates better durability of the functional layer.

A: Vibration drop-off rate ΔM of 0% or more and less than 20%.
B: Vibration drop-off rate ΔM of 20% or more and less than 40%.
C: Vibration drop-off rate ΔM of 40% or more and less than 60%.
D: Vibration drop-off rate ΔM of 60% or more.

<Peel Strength>

A specimen having a rectangular shape of 100 mm in length by 10 mm in width was cut out from the functional layer-equipped separator produced in each of the examples and comparative examples. Cellophane tape was fixed to a test stand beforehand. Tape prescribed by JIS Z1522 was used as the cellophane tape. The specimen was then attached to the cellophane tape with the surface on the functional layer side down. Thus, the surface on the functional layer side of the specimen was attached to the cellophane tape. One end of the separator was then peeled off from the cellophane tape in the vertical direction at a tensile rate of 10 mm/minute while measuring the stress during peeling. This measurement was performed 3 times to obtain an average value of the stress. The average value was taken to be the peel strength. A greater peel strength indicates better close adherence between the functional layer and the separator.

A: Peel strength of 130 N/m or more.
B: Peel strength of 120 N/m or more and less than 130 N/m.
C: Peel strength of 100 N/m or more and less than 120 N/m.
D: Peel strength of less than 100 N/m.

<Output Characteristics of Secondary Battery>

The 800-mAh stacked lithium ion secondary battery produced in each of the examples and comparative examples was left for 24 hours at an ambient temperature of 25° C., and then subjected to a charge/discharge operation at an ambient temperature of 25° C. in which the lithium ion secondary battery was charged to 4.35 V at 0.1 C and discharged to 3.0 V at 0.1 C. The initial capacity $C_0$ in this operation was measured. Thereafter, the lithium ion secondary battery was subjected to a charge/discharge operation at an ambient temperature of 25° C. in which the lithium ion secondary battery was charged to 4.35 V at 0.1 C and discharged to 3.0 V at 2 C, and the capacity $C_1$ was measured. The rate characteristics were evaluated based on ΔC=$(C_0-C_1)/C_0$×100(%). A larger value of ΔC indicates better rate characteristics.

A: ΔC of 90% or more.
B: ΔC of 85% or more and less than 90%.
C: ΔC of 80% or more and less than 85%
D: ΔC of less than 80%.

<High-Temperature Cycle Characteristics of Secondary Battery>

The 800-mAh stacked lithium ion secondary battery produced in each of the examples and comparative examples was subjected to a charge/discharge operation in which 200 cycles of charging to 4.35 V and discharging to 3 V were carried out by a 0.5 C constant-current method at an ambient temperature of 45° C., and the discharge capacity was measured. An average value for five lithium ion secondary batteries was taken to be the measured value. The proportion of the electric capacity after completion of 200 cycles to the discharge capacity after completion of 3 cycles was calculated as a percentage to determine a charge/discharge capacity retention rate. A higher charge/discharge capacity retention rate indicates better high-temperature cycle characteristics of the lithium ion secondary battery.

A: Charge/discharge capacity retention rate of 80% or more.
B: Charge/discharge capacity retention rate of 70% or more and less than 80%.
C: Charge/discharge capacity retention rate of 60% or more and less than 70%.
D: Charge/discharge capacity retention rate of less than 60%.

Example 1

<Production of Water-Soluble Polymer>

A 1 L flask made of glass was charged with 710 g of deionized water. The deionized water was heated to a temperature of 40° C. and the inside of the flask was purged with nitrogen gas at a flow rate of 100 mL/minute. Next, 89.9 g (solid content) of acrylamide as a (meth)acrylamide monomer, 0.1 g (solid content) of ethylene glycol dimethacrylate as a cross-linkable monomer, 9.0 g (solid content) of acrylic acid, and 1.0 g (solid content) of acrylonitrile were mixed and injected into the flask using a syringe. Thereafter, 8.0 g of a 2.5% potassium persulfate aqueous solution was added into the flask using a syringe as a polymerization initiator upon reaction start. After 15 minutes had passed, 20 g of a 2.0% tetramethylethylenediamine aqueous solution was added using a syringe as a polymerization aid, to start a reaction. After 4 hours had passed from the addition of the initiator, 4.0 g of the 2.5% potassium persulfate aqueous solution was added into the flask as a polymerization initiator and further 10 g of the 2.0% tetramethylethylenediamine aqueous solution was added as a polymerization aid.

The flask was heated to a temperature of 60° C. in order to promote a polymerization reaction. After 3 hours had passed, the flask was opened to air to terminate the polymerization reaction, and the product was deodorized at a temperature of 80° C. to remove residual monomers.

The product was subsequently adjusted to a pH of 8 using a 5% sodium hydroxide aqueous solution to yield a water-soluble polymer. The degree of swelling in electrolyte solution of the water-soluble polymer was measured according to the above-mentioned method. The results are shown in Table 1.

<Production of Water-Insoluble Polymer>

An acrylic-based polymer was produced as a water-insoluble polymer according to the following procedure.

A reaction vessel equipped with a stirrer was charged with 70 parts of deionized water, 0.15 parts of sodium lauryl sulfate (produced by Kao Corporation, product name "EMAL 2F") as an emulsifier, and 0.5 parts of ammonium persulfate as a polymerization initiator. The gas phase in the reaction vessel was purged with nitrogen gas and the reaction vessel was heated to 60° C.

In a separate vessel, a monomer mixture was prepared by mixing 50 parts of deionized water, 0.5 parts of sodium dodecylbenzenesulfonate as a dispersant, and, as polymerizable monomers, 4.0 parts of acrylic acid as an ethylenically unsaturated carboxylic acid monomer, 1.8 parts of allyl glycidyl ether as a hydrophilic cross-linkable monomer, 0.2 parts of allyl methacrylate as a hydrophobic cross-linkable monomer, 45.0 parts of styrene as an aromatic monovinyl monomer, and 49.0 parts of 2-ethylhexyl acrylate as an acrylic acid ester monomer. The monomer mixture was added continuously to the reaction vessel over a period of 4 hours and was caused to polymerize. A reaction was carried out at 70° C. during the addition. After the addition was complete, stirring was performed for a further 3 hours at 80° C. to complete the reaction and produce a water dispersion including an acrylic-based polymer as a water-insoluble polymer.

The volume-average particle diameter, degree of swelling in electrolyte solution, and glass-transition temperature of the obtained water-insoluble polymer were measured according to the above-mentioned methods. The results are shown in Table 1.

<Production of Dispersant>

50 parts of water, 80 parts of acrylic acid, 19.92 parts of acrylamido-2-methylpropane sulfonic acid, and 0.08 parts of 2-(N-acryloyl)amino-2-methyl-1,3-propane-disulfonic acid were mixed to obtain a monomer composition. 150 parts of water were charged into a four-neck flask equipped with a thermometer, a stirrer, and a reflux condenser, and heated to 80° C. While stirring, the monomer composition and 10 parts of a 30% sodium persulfate aqueous solution were each continuously dripped into the flask for 3 hours using a constant rate pump, to perform a polymerization reaction at 80° C. After the dripping was complete, further the system was aged for 1 hour while kept at 80° C., to complete the polymerization reaction. After this, 120 parts of a 32% sodium hydroxide aqueous solution were added into the flask to completely neutralize the reaction liquid, thus obtaining a polycarboxylic acid-sulfonic acid copolymer aqueous solution. The weight-average molecular weight of this polymer was 11000. This polycarboxylic acid-sulfonic acid copolymer was used as a dispersant.

<Production of Composition for Functional Layer>

Deionized water was added to 100 parts of barium sulfate particles (specific gravity: 4.4 g/cm$^3$, specific surface area: 5.5 m$^2$/g, volume-average particle diameter: 0.50 μm) as non-conductive particles and 1.0 part of the polycarboxylic acid-sulfonic acid copolymer as a dispersant so that the solid content concentration was 55 mass %, and the barium sulfate particles were dispersed using a media-less disperser (product name: LMZ-015, manufacturer: Ashizawa Finetech Ltd.) with beads of 0.4 mm in diameter at a circumferential velocity of 6 m/second and a flow rate of 0.3 L/minute. The volume-average particle diameter of the barium sulfate particles in the dispersion liquid measured by a laser diffraction particle diameter distribution measurement device (SALD-7100 produced by Shimadzu Corporation) was 0.65 μm. 2 parts by mass by solid content equivalents of the above-mentioned water-soluble polymer relative to 100 parts by mass of the non-conductive particles were then added to and mixed with the dispersion liquid. Next, 3.5 parts by solid content equivalents of the above-mentioned water-insoluble polymer relative to 100 parts by mass of the non-conductive particles and, as a wetting agent, 0.3 parts by mass of a polymer (weight-average molecular weight: 8000, degree of swelling in electrolyte solution: 2.2 times) with an ethylene oxide-propylene oxide polymerization ratio of 50:50 (molar ratio) as a nonionic surfactant were each added, and deionized water was mixed so that the solid content concentration was 50 mass %, to produce a slurry composition for a functional layer. The dispersion stability of the obtained composition for a functional layer was evaluated according to the above-mentioned method. The results are shown in Table 1.

<Production of Functional Layer-Equipped Separator>

The above-mentioned composition for a functional layer was applied onto a single-layered polyethylene separator substrate (Gurley value: 155 sec/100 cc) of 250 mm in width, 1,000 m in length, and 12 μm in thickness that had been produced by a wet method. The composition for a functional layer was applied using a gravure coater at a speed of 20 m/minute so as to have a thickness after drying of 2.0 μm. The applied composition was then dried in a 50° C. drying furnace to produce a functional layer-equipped separator that was then wound up.

The heat contraction resistance, vibration drop-off resistance, and peel strength of the obtained functional layer-equipped separator were evaluated according to the above-mentioned methods. The results are shown in Table 1.

<Production of Particulate Binder for Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to start polymerization. The reaction was terminated by cooling at the point at which the polymerization conversion rate reached 96%, to yield a mixture containing a particulate binder (SBR). The mixture containing the particulate binder was adjusted to pH 8 through addition of a 5% sodium hydroxide aqueous solution. Thereafter, unreacted monomers were removed from the mixture by heated vacuum distillation. Cooling was subsequently performed to 30° C. or less, to obtain a water dispersion containing a desired particulate binder for a negative electrode.

<Production of Slurry Composition for Negative Electrode>

100 parts of artificial graphite (volume-average particle diameter: 15.6 μm) and 1 part by solid content equivalents of a 2% aqueous solution of a carboxymethyl cellulose sodium salt (produced by Nippon Paper Industries Co., Ltd., MAC350HC) as a thickener were mixed and further deionized water was added to adjust the solid content concentration to 68%, and mixing was performed for 60 minutes at 25° C. Deionized water was added to the resultant mixed solution to adjust the solid content concentration to 62%, and further mixing was performed for 15 minutes at 25° C. Thereafter, 1.5 parts by solid content equivalents of the water dispersion containing the particulate binder were added to the mixed solution and further deionized water was added to adjust the final solid content concentration to 52%, and further mixing was performed for 10 minutes. The resultant mixed liquid was subjected to a defoaming process under reduced pressure, to yield a slurry for a negative electrode having good fluidity.

<Production of Negative Electrode>

A comma coater was used to apply the slurry for a negative electrode onto copper foil of 20 μm in thickness, used as a current collector, so as to have a thickness of approximately 150 μm after drying. The applied slurry was dried by conveying the copper foil inside a 60° C. oven for 2 minutes at a speed of 0.5 m/minute. Thereafter, heat treatment was performed for 2 minutes at 120° C. to obtain a pre-pressing negative electrode web. The pre-pressing negative electrode web was rolled by roll pressing, to obtain a post-pressing negative electrode including a negative electrode active material layer of 80 μm in thickness.

<Production of Slurry for Positive Electrode>

A mixture of 100 parts of $LiCoO_2$ with a volume-average particle diameter of 12 μm as a positive electrode active material, 2 parts of acetylene black (produced by Denki Kagaku Kogyo Kabushiki Kaisha, product name: HS-100) as a conductive material, and 2 parts by solid content equivalents of polyvinylidene fluoride (produced by Kureha Corporation, product name: #7208) as a binder for a positive electrode was prepared, and the total solid content concentration thereof was adjusted to 70% through addition of N-methylpyrrolidone. A planetary mixer was then used to perform mixing to yield a slurry for a positive electrode.

<Production of Positive Electrode>

A comma coater was used to apply the slurry for a positive electrode onto aluminum foil of 20 μm in thickness, used as a current collector, so as to have a thickness of approximately 150 μm after drying. The applied slurry was dried by conveying the aluminum foil inside a 60° C. oven for 2 minutes at a speed of 0.5 m/minute. Thereafter, heat treatment was performed for 2 minutes at 120° C., to obtain a pre-pressing positive electrode web. The pre-pressing positive electrode web was rolled by roll pressing, to obtain a positive electrode.

<Production of Lithium Ion Secondary Battery>

The post-pressing positive electrode was cut out to 49 cm×5 cm, and the functional layer-equipped separator cut out to 55 cm×5.5 cm was arranged on the positive electrode active material layer of the cut positive electrode. Moreover, the post-pressing negative electrode was cut out to 50 cm×5.2 cm, and arranged on the side of the separator opposite to the positive electrode so that the surface on the negative electrode active material layer side faced the functional layer-equipped separator. The product was then wound by a winding machine to obtain a wound product. The wound product was pressed at 60° C. and 0.5 MPa, to obtain a flat product. The flat product was packed in an aluminum packing case used as a battery case. The aluminum packing case was filled with an electrolyte solution (solvent: ethylene carbonate (EC)/ethyl methyl carbonate (EMC)/vinylene carbonate (VC)=68.5/30/1.5 (volume ratio), electrolyte: $LiPF_6$ of 1M in concentration) so that no air remained. Thereafter, a laminate including the positive electrode and the functional layer-equipped separator and a laminate including the negative electrode and the functional layer-equipped separator were obtained by performing heat pressing for 10 seconds at a temperature of 80° C. and a pressure of 0.5 MPa to pressure bond the positive electrode and the negative electrode to the separator. The aluminum case was then closed by heat sealing at 150° C. to tightly seal an opening of the aluminum packing. In this manner, a wound lithium ion secondary battery of 800 mAh was produced.

The output characteristics and high-temperature cycle characteristics of the obtained lithium ion secondary battery were evaluated according to the above-mentioned methods. The results are shown in Table 1.

Examples 2 to 5

A composition for a functional layer, a functional layer, a functional layer-equipped separator, and a lithium ion secondary battery were produced in the same way as Example 1, except that the composition ratio of the water-soluble polymer was changed as shown in Table 1. Each measurement and evaluation were then performed in the same way as in Example 1. The results are shown in Table 1.

Examples 6 to 9 and 15 to 16

A composition for a functional layer, a functional layer, a functional layer-equipped separator, and a lithium ion secondary battery were produced in the same way as Example 1, except that the composition ratio of the water-insoluble polymer was changed as shown in Table 1. Each measurement and evaluation were then performed in the same way as in Example 1. The results are shown in Table 1.

Example 10

In the production of the water-insoluble polymer, from a vessel A containing a mixture of 13.0 parts of vinylidene fluoride and 7.0 parts of hexafluoropropylene as fluorine-containing olefins which are fluorine-containing monomers as polymerizable monomers and 0.35 parts of sodium lauryl sulfate as an emulsifier, adding the mixture to a pressure vessel B was started. At the same time, adding 1 part of potassium persulfate as a polymerization initiator to the pressure vessel B was started to start polymerization. The reaction temperature was maintained at 75° C.

After 4 hours from the polymerization start (after addition of 70% of the total monomer composition), 2.0 parts of acrylic acid as an ethylenically unsaturated carboxylic acid monomer unit, 30.0 parts of styrene as an aromatic monovinyl monomer, and 48.0 parts of 2-ethylhexyl acrylate as an acrylic acid ester monomer were added to the pressure vessel B for an hour and a half.

After 5 hours and a half from the polymerization start, the addition of the total amount of the monomer composition was complete. The contents of the pressure vessel B were then further heated to 85° C. and reacted for 6 hours.

The reaction was terminated by cooling at the point at which the polymerization conversion rate reached 97%, to yield a water-insoluble polymer. The water-insoluble polymer was adjusted to pH 8 through addition of a 5% sodium hydroxide aqueous solution. Thereafter, unreacted monomers were removed from the mixture by heated vacuum distillation. Cooling was subsequently performed, to obtain a water dispersion (solid content concentration: 40%) containing a desired water-insoluble polymer. Using the water dispersion containing the water-insoluble polymer, a composition for a functional layer, a functional layer, a functional layer-equipped separator, and a lithium ion secondary battery were produced in the same way as Example 1. Each measurement and evaluation were then performed in the same way as in Example 1. The results are shown in Table 1.

Examples 11 to 14

In the production of a water-insoluble polymer, a water-insoluble polymer was produced in the same way as Example 10, except that 2,2,2-trifluoroethyl methacrylate (Examples 11 and 14), 2,2,2-trifluoroethyl acrylate (Example 12), or 1,1,1,3,3,3-hexafluoroisopropyl acrylate (Example 13) was further added in the proportion shown in Table 1 as a fluorine-containing (meth)acrylate which is a fluorine-containing monomer, and the blending amounts of the other polymerizable monomers were changed as shown in Table 1. A composition for a functional layer, a functional layer, a functional layer-equipped separator, and a lithium ion secondary battery were produced in the same way as Example 1, except that the water-insoluble polymer thus obtained was used. Each measurement and evaluation were then performed in the same way as in Example 1. The results are shown in Table 1.

Examples 17 to 18

A composition for a functional layer, a functional layer, a functional layer-equipped separator, and a lithium ion secondary battery were produced in the same way as Example 1, except that the addition proportion of the water-insoluble polymer was changed as shown in Table 1 in the production of a composition for a functional layer. Each measurement and evaluation were then performed in the same way as in Example 1. The results are shown in Table 1.

Example 19

A composition for a functional layer, a functional layer, a functional layer-equipped separator, and a lithium ion secondary battery were produced in the same way as Example 1, except that alumina particles (LS256 produced by Nippon Light Metal Co., Ltd., specific gravity: 3.94 g/cm$^3$, specific surface area: 6.0 m$^2$/g, volume-average particle diameter: 0.60 μm) were used as non-conductive particles in the production of a composition for a functional layer. Each measurement and evaluation were then performed in the same way as in Example 1. The results are shown in Table 1.

Example 20

A composition for a functional layer, a functional layer, a functional layer-equipped separator, and a lithium ion secondary battery were produced in the same way as Example 1, except that 25 parts of organic particles (OP) having a core-shell structure produced as follows were used as non-conductive particles in the production of a composition for a functional layer. Each measurement and evaluation were then performed in the same way as in Example 1. The results are shown in Table 1.

<Production of Non-Conductive Particles>

As non-conductive particles, organic particles having a core-shell structure were produced according to the following procedure.

A 5 MPa pressure vessel equipped with a stirrer was charged with, as a monomer composition used for the production of a core portion, 75 parts of methyl methacrylate as an acrylic acid ester monomer, 4 parts of methacrylic acid as an acid group-containing monomer, 1 part of ethylene dimethacrylate as a cross-linkable monomer, 1 part of sodium dodecylbenzenesulfonate as an emulsifier, 150 parts of deionized water, and 0.5 parts of potassium persulfate as a polymerization initiator. The contents of the pressure vessel were sufficiently stirred. After this, the monomer composition was heated to 60° C. to start polymerization. Polymerization was continued until a polymerization conversion rate of 96% was reached to yield a water dispersion containing a polymer forming a core portion of organic particles having a core-shell structure.

Next, as a monomer composition used for the production of a shell portion, 20 parts of styrene as an aromatic monovinyl monomer were continuously added to the water dispersion and polymerization was continued while heating the contents of the pressure vessel to 70° C. The reaction was terminated by cooling at the point at which the polymerization conversion rate reached 96%. As a result, a water dispersion containing organic particles having a core-shell structure was produced. The resultant organic particles had a volume-average particle diameter of 0.50 μm, a specific gravity of 1.1 g/cm$^3$, and a specific surface area of 0.06 m$^2$/g. Moreover, the glass-transition temperature of the shell portion was measured by the above-mentioned measurement method for the glass-transition temperature of the water-insoluble polymer. Here, a measurement sample used in the measurement of glass-transition temperature was the measurement sample that prepared by polymerizing the monomer composition same as the composition used in the production of the shell portion, under the same polymerization conditions as in the production of the shell portion, producing a water dispersion containing the derived polymer, and drying the dispersion. The glass-transition temperature of the shell portion was 105° C.

Example 21

A composition for a functional layer, a functional layer, a functional layer-equipped separator, and a lithium ion secondary battery were produced in the same way as Example 1, except that the composition ratio of the water-soluble polymer was changed as shown in Table 1. Each measurement and evaluation were then performed in the same way as in Example 1. The results are shown in Table 1.

Comparative Examples 1, 4, and 6

A composition for a functional layer, a functional layer, a functional layer-equipped separator, and a lithium ion secondary battery were produced in the same way as Example 1, except that the composition ratios of the water-soluble polymer and the water-insoluble polymer were changed as shown in Table 1. Each measurement and evaluation were then performed in the same way as in Example 1. The results are shown in Table 1.

Comparative Examples 2 and 5

A composition for a functional layer, a functional layer, a functional layer-equipped separator, and a lithium ion secondary battery were produced in the same way as Example 1, except that the composition ratio of the water-insoluble polymer was changed as shown in Table 1. Each measurement and evaluation were then performed in the same way as in Example 1. The results are shown in Table 1.

Comparative Example 3

A composition for a functional layer, a functional layer, a functional layer-equipped separator, and a lithium ion secondary battery were produced in the same way as Example 1, except that the composition ratio of the water-soluble polymer was changed as shown in Table 1. Each measurement and evaluation were then performed in the same way as in Example 1. The results are shown in Table 1.

In the table, "AAm" denotes acrylamide, "EDMA" denotes ethylene glycol dimethacrylate, "AA" denotes acrylic acid, "AN" denotes acrylonitrile, "AGE" denotes allyl glycidyl ether, "AMA" denotes allyl methacrylate, "ST" denotes styrene, "2EHA" denotes 2-ethylhexyl acrylate, "VDF" denotes vinylidene fluoride, "HFP" denotes hexafluoropropylene, "BaS" denotes barium sulfate particles, "TFEMA" denotes 2,2,2-trifluoroethyl methacrylate, "TFEA" denotes 2,2,2-trifluoroethyl acrylate, "HFIPA" denotes 1,1,1,3,3,3-hexafluoroisopropyl acrylate, and "OP" denotes organic particles.

TABLE 1

| | | | | Example | | | | | | |
|---|---|---|---|---|---|---|---|---|---|---|
| | | | | 1 | 2 | 3 | 4 | 5 | 6 | 7 |
| Composition for functional layer | Non-conductive particles | Type | | BaS | BaS | BaS | BaS | BaS | BaS | BaS |
| | | Volume-average particle diameter [μm] | | 0.50 | 0.50 | 0.50 | 0.50 | 0.50 | 0.50 | 0.50 |
| | | Content [parts by mass] | | 100 | 100 | 100 | 100 | 100 | 100 | 100 |
| | Water-soluble polymer | Composition | (Meth)acrylamide monomer unit | AAm [mass %] | 89.9 | 89.98 | 88.3 | 70.0 | 96.98 | 89.9 | 89.9 |
| | | | Cross-linkable monomer unit | EDMA [mass %] | 0.1 | 0.02 | 1.7 | 0.1 | 0.02 | 0.1 | 0.1 |
| | | | Other monomer units | AA [mass %] | 9.0 | 9.0 | 9.0 | 20.0 | 2.0 | 9.0 | 9.0 |
| | | | | AN [mass %] | 1.0 | 1.0 | 1.0 | 9.9 | 1.0 | 1.0 | 1.0 |
| | | Properties | Degree of swelling in electrolyte solution [times] | | 1.3 | 1.6 | 1.1 | 1.7 | 1.3 | 1.3 | 1.3 |
| | | Content [parts by mass] | | | 2 | 2 | 2 | 2 | 2 | 2 | 2 |
| | Water-insoluble polymer | Composition | Ethylenically unsaturated carboxylic acid monomer unit | AA [mass %] | 4.0 | 4.0 | 4.0 | 4.0 | 4.0 | 3.98 | 4.0 |
| | | | Cross-linkable monomer unit | AGE [mass %] | 1.8 | 1.8 | 1.8 | 1.8 | 1.8 | 0.02 | 1.8 |
| | | | | AMA [mass %] | 0.2 | 0.2 | 0.2 | 0.2 | 0.2 | — | 0.7 |
| | | | Aromatic monovinyl monomer unit | ST [mass %] | 45.0 | 45.0 | 45.0 | 45.0 | 45.0 | 47.0 | 44.5 |
| | | | Fluorine-containing (meth)acrylate monomer unit | Type | — | — | — | — | — | — | — |
| | | | | Blending amount [mass %] | — | — | — | — | — | — | — |
| | | | Acrylic acid ester monomer unit | 2EHA [mass %] | 49.0 | 49.0 | 49.0 | 49.0 | 49.0 | 49.00 | 49.0 |
| | | | Fluorine-containing olefin monomer unit | VDF [mass %] | — | — | — | — | — | — | — |
| | | | | HFP [mass %] | — | — | — | — | — | — | — |
| | | Properties | Degree of swelling in electrolysis solution [times] | | 1.8 | 1.8 | 1.8 | 1.8 | 1.8 | 2.0 | 1.5 |
| | | | Volume-average particle diameter [μm] | | 0.18 | 0.18 | 0.18 | 0.18 | 0.18 | 0.22 | 0.20 |
| | | | Glass-transition temperature [°C.] | | 10 | 10 | 10 | 10 | 10 | 0 | 15 |
| | | Content [parts by mass] | | | 3.5 | 3.5 | 3.5 | 3.5 | 3.5 | 3.5 | 3.5 |
| | Mass ratio of water-insoluble polymer/water-soluble polymer [times] | | | | 1.75 | 1.75 | 1.75 | 1.75 | 1.75 | 1.75 | 1.75 |
| Evaluation | Dispersion stability of composition for functional layer | | | | A | B | A | A | B | A | A |
| | Heat contraction resistance of functional layer | | | | A | A | B | B | A | B | A |
| | Vibration drop-off resistance of functional layer | | | | A | A | A | A | A | A | A |
| | Peel strength of functional layer | | | | A | A | A | A | A | A | A |
| | Output characteristics of secondary battery | | | | A | B | B | B | A | B | A |
| | High-temperature cycle characteristics of secondary battery | | | | A | B | A | B | A | B | A |

| | | | | Example | | | | | | |
|---|---|---|---|---|---|---|---|---|---|---|
| | | | | 8 | 9 | 10 | 11 | 12 | 13 | 14 |
| Composition for functional layer | Non-conductive particles | Type | | BaS | BaS | BaS | BaS | BaS | BaS | BaS |
| | | Volume-average particle diameter [μm] | | 0.50 | 0.50 | 0.50 | 0.50 | 0.50 | 0.50 | 0.50 |
| | | Content [parts by mass] | | 100 | 100 | 100 | 100 | 100 | 100 | 100 |
| | Water-soluble polymer | Composition | (Meth)acrylamide monomer unit | AAm [mass %] | 89.9 | 89.9 | 89.9 | 89.9 | 89.9 | 89.9 | 89.9 |
| | | | Cross-linkable monomer unit | EDMA [mass %] | 0.1 | 0.1 | 0.1 | 0.1 | 0.1 | 0.1 | 0.1 |
| | | | Other monomer units | AA [mass %] | 9.0 | 9.0 | 9.0 | 9.0 | 9.0 | 9.0 | 9.0 |
| | | | | AN [mass %] | 1.0 | 1.0 | 1.0 | 1.0 | 1.0 | 1.0 | 1.0 |
| | | Properties | Degree of swelling in electrolyte solution [times] | | 1.3 | 1.3 | 1.3 | 1.3 | 1.3 | 1.3 | 1.3 |
| | | Content [parts by mass] | | | 2 | 2 | 2 | 2 | 2 | 2 | 2 |

TABLE 1-continued

|  |  |  |  |  |  |  |  |  |  |  |
|---|---|---|---|---|---|---|---|---|---|---|
|  | Water-insoluble polymer | Composition | Ethylenically unsaturated carboxylic acid monomer unit | AA [mass %] | 5.0 | 1.8 | 2.0 | 2.0 | 2.0 | 2.0 | 2.0 |
|  |  |  | Cross-linkable monomer unit | AGE [mass %] | 1.8 | 1.8 | — | — | — | — | — |
|  |  |  |  | AMA [mass %] | 0.2 | 0.2 | — | — | — | — | — |
|  |  |  | Aromatic monovinyl monomer unit | ST [mass %] | 45.0 | 45.0 | 30.0 | 30.0 | 30.0 | 30.0 | 28.0 |
|  |  |  | Fluorine-containing (meth)acrylate monomer unit | Type | — | — | — | TFEMA | TFEA | HFIPA | TFEMA |
|  |  |  |  | Blending amount [mass %] | — | — | — | 2.0 | 2.0 | 2.0 | 4.0 |
|  |  |  | Acrylic acid ester monomer unit | 2EHA [mass %] | 48.0 | 51.2 | 48.0 | 48.0 | 48.0 | 48.0 | 48.0 |
|  |  |  | Fluorine-containing olefin monomer unit | VDF [mass %] | — | — | 13.0 | 13.0 | 13.0 | 13.0 | 13.0 |
|  |  |  |  | HFP [mass %] | — | — | 7.0 | 5.0 | 5.0 | 5.0 | 5.0 |
|  |  | Properties | Degree of swelling in electrolysis solution [times] |  | 1.95 | 1.8 | 1.9 | 1.9 | 1.8 | 1.9 | 1.4 |
|  |  |  | Volume-average particle diameter [μm] |  | 0.18 | 0.18 | 0.11 | 0.20 | 0.25 | 0.22 | 0.20 |
|  |  |  | Glass-transition temperature [° C.] |  | 10 | 10 | 0 | 10 | 5 | 5 | 15 |
|  |  | Content [parts by mass] |  |  | 3.5 | 3.5 | 3.5 | 3.5 | 3.5 | 3.5 | 3.5 |
|  | Mass ratio of water-insoluble polymer/water-soluble polymer [times] |  |  |  | 1.75 | 1.75 | 1.75 | 1.75 | 1.75 | 1.75 | 1.75 |
| Evaluation | Dispersion stability of composition for functional layer |  |  |  | A | B | B | B | B | B | A |
|  | Heat contraction resistance of functional layer |  |  |  | B | A | B | B | B | B | B |
|  | Vibration drop-off resistance of functional layer |  |  |  | A | A | A | A | A | A | A |
|  | Peel strength of functional layer |  |  |  | A | A | B | B | B | B | A |
|  | Output characteristics of secondary battery |  |  |  | B | A | B | A | A | A | A |
|  | High-temperature cycle characteristics of secondary battery |  |  |  | B | A | A | A | A | A | B |

|  |  |  |  |  | Example |  |  |  |  |  |  |
|---|---|---|---|---|---|---|---|---|---|---|---|
|  |  |  |  |  | 15 | 16 | 17 | 18 | 19 | 20 | 21 |
| Composition for functional layer | Non-conductive particles | Type |  |  | BaS | BaS | BaS | BaS | Al₂O₃ | OP | BaS |
|  |  | Volume-average particle diameter [μm] |  |  | 0.50 | 0.50 | 0.50 | 0.50 | 0.60 | 0.50 | 0.50 |
|  |  | Content [parts by mass] |  |  | 100 | 100 | 100 | 100 | 100 | 25 | 100 |
|  | Water-soluble polymer | Composition | (Meth)acrylamide monomer unit | AAm [mass %] | 89.9 | 89.9 | 89.9 | 89.9 | 89.9 | 89.9 | 74.0 |
|  |  |  | Cross-linkable monomer unit | EDMA [mass %] | 0.1 | 0.1 | 0.1 | 0.1 | 0.1 | 0.1 | 0.1 |
|  |  |  | Other monomer units | AA [mass %] | 9.0 | 9.0 | 9.0 | 9.0 | 9.0 | 9.0 | 25.9 |
|  |  |  |  | AN [mass %] | 1.0 | 1.0 | 1.0 | 1.0 | 1.0 | 1.0 | — |
|  |  | Properties | Degree of swelling in electrolyte solution [times] |  | 1.3 | 1.3 | 1.3 | 1.3 | 1.3 | 1.3 | 1.3 |
|  |  | Content [parts by mass] |  |  | 2 | 2 | 2 | 2 | 2 | 2 | 2 |
|  | Water-insoluble polymer | Composition | Ethylenically unsaturated carboxylic acid monomer unit | AA [mass %] | 4.0 | 4.0 | 4.0 | 4.0 | 4.0 | 4.0 | 4.0 |
|  |  |  | Cross-linkable monomer unit | AGE [mass %] | 1.8 | 1.8 | 1.8 | 1.8 | 1.8 | 1.8 | 1.8 |
|  |  |  |  | AMA [mass %] | 0.2 | 0.2 | 0.2 | 0.2 | 0.2 | 0.2 | 0.2 |
|  |  |  | Aromatic monovinyl monomer unit | ST [mass %] | 58.0 | 17.0 | 45.0 | 45.0 | 45.0 | 45.0 | 45.0 |
|  |  |  | Fluorine-containing (meth)acrylate monomer unit | Type | — | — | — | — | — | — | — |
|  |  |  |  | Blending amount [mass %] | — | — | — | — | — | — | — |
|  |  |  | Acrylic acid ester monomer unit | 2EHA [mass %] | 36.0 | 77.0 | 49.0 | 49.0 | 49.0 | 49.0 | 49.0 |
|  |  |  | Fluorine-containing olefin monomer unit | VDF [mass %] | — | — | — | — | — | — | — |
|  |  |  |  | HFP [mass %] | — | — | — | — | — | — | — |
|  |  | Properties | Degree of swelling in electrolysis solution [times] |  | 1.6 | 2.0 | 1.8 | 1.8 | 1.8 | 1.8 | 1.8 |
|  |  |  | Volume-average particle diameter [μm] |  | 0.20 | 0.18 | 0.18 | 0.18 | 0.18 | 0.18 | 0.18 |
|  |  |  | Glass-transition temperature [° C.] |  | 20 | −10 | 10 | 10 | 10 | 10 | 10 |
|  |  | Content [parts by mass] |  |  | 3.5 | 3.5 | 4.6 | 1.0 | 3.5 | 3.5 | 3.5 |
|  | Mass ratio of water-insoluble polymer/water-soluble polymer [times] |  |  |  | 1.75 | 1.75 | 2.3 | 0.5 | 1.75 | 1.75 | 1.75 |
| Evaluation | Dispersion stability of composition for functional layer |  |  |  | A | A | A | A | A | A | A |
|  | Heat contraction resistance of functional layer |  |  |  | B | B | B | B | A | A | A |
|  | Vibration drop-off resistance of functional layer |  |  |  | A | B | A | B | A | A | A |
|  | Peel strength of functional layer |  |  |  | A | A | A | B | A | A | A |
|  | Output characteristics of secondary battery |  |  |  | B | B | B | A | A | A | A |
|  | High-temperature cycle characteristics of secondary battery |  |  |  | B | B | A | B | A | A | A |

TABLE 1-continued

|  |  |  |  | Comparative Example | | | | | |
|---|---|---|---|---|---|---|---|---|---|
|  |  |  |  | 1 | 2 | 3 | 4 | 5 | 6 |
| Composition for functional layer | Non-conductive particles | Type | | BaS | BaS | BaS | BaS | BaS | BaS |
| | | Volume-average particle diameter [μm] | | 0.50 | 0.50 | 0.50 | 0.50 | 0.50 | 0.50 |
| | | Content [parts by mass] | | 100 | 100 | 100 | 100 | 100 | 100 |
| | Water-soluble polymer | Composition | (Meth)acrylamide monomer unit | AAm [mass %] | 29.9 | 89.9 | 29.9 | 29.9 | 89.9 | 70.0 |
| | | | Cross-linkable monomer unit | EDMA [mass %] | 0.1 | 0.1 | 0.1 | 0.1 | 0.1 | 0.1 |
| | | | Other monomer units | AA [mass %] | 69.0 | 9.0 | 69.0 | 69.0 | 9.0 | 20.0 |
| | | | | AN [mass %] | 1.0 | 1.0 | 1.0 | 1.0 | 1.0 | 9.9 |
| | | Properties | Degree of swelling in electrolyte solution [times] | | 2.2 | 1.3 | 2.2 | 2.2 | 1.3 | 2.1 |
| | | Content [parts by mass] | | | 2 | 2 | 2 | 2 | 2 | 2 |
| | Water-insoluble polymer | Composition | Ethylenically unsaturated carboxylic acid monomer unit | AA [mass %] | 6.0 | 6.0 | 4.0 | 6.0 | 6.0 | 6.0 |
| | | | Cross-linkable monomer unit | AGE [mass %] | 0.8 | 0.8 | 1.8 | 2.2 | 2.2 | 0.8 |
| | | | | AMA [mass %] | 0.2 | 0.2 | 0.2 | 0.3 | 0.3 | 0.2 |
| | | | Aromatic monovinyl monomer unit | ST [mass %] | 45.0 | 45.0 | 45.0 | 45.0 | 45.0 | 45.0 |
| | | | Fluorine-containing (meth)acrylate monomer unit | Type | — | — | — | — | — | — |
| | | | | Blending amount [mass %] | — | — | — | — | — | — |
| | | | Acrylic acid ester monomer unit | 2EHA [mass %] | 48.0 | 48.0 | 49.0 | 46.5 | 46.5 | 48.0 |
| | | | Fluorine-containing olefin monomer unit | VDF [mass %] | — | — | — | — | — | — |
| | | | | HFP [mass %] | — | — | — | — | — | — |
| | | Properties | Degree of swelling in electrolysis solution [times] | | 3.5 | 3.5 | 1.8 | 2.0 | 2.0 | 3.5 |
| | | | Volume-average particle diameter [μm] | | 0.37 | 0.37 | 0.18 | 0.22 | 0.22 | 0.37 |
| | | | Glass-transition temperature [° C.] | | 10 | 10 | 10 | 10 | 10 | 10 |
| | | Content [parts by mass] | | | 3.5 | 3.5 | 3.5 | 3.5 | 3.5 | 3.5 |
| | Mass ratio of water-insoluble polymer/water-soluble polymer [times] | | | 1.75 | 1.75 | 1.75 | 1.75 | 1.75 | 1.75 |
| Evaluation | Dispersion stability of composition for functional layer | | | A | A | B | B | B | A |
| | Heat contraction resistance of functional layer | | | D | C | D | D | D | C |
| | Vibration drop-off resistance of functional layer | | | D | D | C | C | B | C |
| | Peel strength of functional layer | | | D | D | C | D | B | C |
| | Output characteristics of secondary battery | | | D | C | D | D | C | C |
| | High-temperature cycle characteristics of secondary battery | | | D | C | C | C | C | C |

The results in Table 1 demonstrate the following: In Examples 1 to 21 using in combination non-conductive particles, a water-soluble polymer containing a (meth)acrylamide monomer unit in a proportion of 70.0 mass % or more and 99.0 mass % or less, and a water-insoluble polymer containing an ethylenically unsaturated carboxylic acid monomer unit in a proportion of 1.5 mass % or more and 5.0 mass % or less and having a degree of swelling in electrolyte solution of more than 1.0 time and 3.0 times or less, the functional layer had excellent vibration drop-off resistance and heat contraction resistance, contributing to improved electrical characteristics of the secondary battery (in particular high-temperature cycle characteristics and output characteristics). In Comparative Example 1 having a water-soluble polymer not satisfying the predetermined composition conditions and a water-insoluble polymer not satisfying the predetermined composition conditions and properties, the vibration drop-off resistance and heat contraction resistance of the functional layer were low, and the electrical characteristics of the secondary battery (in particular high-temperature cycle characteristics and output characteristics) could not be improved. Comparative Example 2 having a water-soluble polymer satisfying the predetermined composition conditions but having a water-insoluble polymer not satisfying the predetermined composition conditions and properties and Comparative Example 5 having a water-insoluble polymer not satisfying the predetermined composition conditions were slightly better than Comparative Example 1 in the electrical characteristics of the secondary battery, but inferior to the Examples in the vibration drop-off resistance and heat contraction resistance of the functional layer and the electrical characteristics of the secondary battery. Comparative Examples 3 and 4 having a water-soluble polymer and/or a water-insoluble polymer not satisfying the predetermined composition conditions were slightly better than Comparative Example 1 in the vibration drop-off resistance of the functional layer, but inferior to the Examples in the vibration drop-off resistance and heat contraction resistance of the functional layer and the electrical characteristics of the secondary battery. Comparative Example 6 having a water-insoluble polymer not satisfying the predetermined composition conditions and properties was better than Comparative Example 1 in various characteristics, but inferior to the Examples in various characteristics

INDUSTRIAL APPLICABILITY

It is thus possible to provide a composition for a non-aqueous secondary battery functional layer capable of forming a functional layer for a non-aqueous secondary battery excellent in vibration drop-off resistance in electrolyte solution and heat contraction resistance. With use of the composition for a non-aqueous secondary battery functional layer, a functional layer for a non-aqueous secondary battery excellent in vibration drop-off resistance in electrolyte solution and heat contraction resistance and a non-aqueous secondary battery including the functional layer for a non-aqueous secondary battery can be formed favorably.

The invention claimed is:

1. A composition for a non-aqueous secondary battery functional layer, comprising:
    non-conductive particles;
    a water-soluble polymer containing a (meth)acrylamide monomer unit in a proportion of 70.0 mass % or more and 99.0 mass % or less; and
    a water-insoluble polymer containing an ethylenically unsaturated carboxylic acid monomer unit in a proportion of 1.5 mass % or more and 5.0 mass % or less and having a degree of swelling in electrolyte solution of more than 1.0 time and 3.0 times or less.

2. The composition for a non-aqueous secondary battery functional layer according to claim 1,
    wherein the water-soluble polymer contains a cross-linkable monomer unit in a proportion of 0.01 mass % or more and 4.0 mass % or less.

3. The composition for a non-aqueous secondary battery functional layer according to claim 1,
    wherein the water-insoluble polymer contains a cross-linkable monomer unit in a proportion of 0.01 mass % or more and 4.0 mass % or less.

4. The composition for a non-aqueous secondary battery functional layer according to claim 1,
    wherein the water-soluble polymer has a degree of swelling in electrolyte solution of more than 1.0 time and 2.0 times or less.

5. The composition for a non-aqueous secondary battery functional layer according to claim 1,
    wherein the water-insoluble polymer contains an aromatic monovinyl monomer unit in a proportion of 10 mass % or more and 60 mass % or less.

6. The composition for a non-aqueous secondary battery functional layer according to claim 1,
    wherein a content by mass of the water-insoluble polymer is 0.1 times or more and 2.5 times or less the water-soluble polymer.

7. A functional layer for a non-aqueous secondary battery formed using the composition for a non-aqueous secondary battery functional layer according to claim 1.

8. A non-aqueous secondary battery comprising the functional layer for a non-aqueous secondary battery according to claim 7.

* * * * *